United States Patent
Kolegraff

(10) Patent No.: US 10,339,599 B2
(45) Date of Patent: Jul. 2, 2019

(54) SYSTEM AND METHOD FOR AUTOMATED MANAGEMENT OF SERVICE INDUSTRY AND FOR-HIRE RESOURCES

(71) Applicant: Whiteboard, LLC, Corte Madera, CA (US)

(72) Inventor: Nicholas Keith Kolegraff, Greenbrae, CA (US)

(73) Assignee: Whiteboard, LLC, Corte Madera, CA (US)

( * ) Notice: Subject to any disclaimer, the term of this patent is extended or adjusted under 35 U.S.C. 154(b) by 45 days.

(21) Appl. No.: 15/634,925

(22) Filed: Jun. 27, 2017

(65) Prior Publication Data

US 2017/0372411 A1   Dec. 28, 2017

Related U.S. Application Data

(60) Provisional application No. 62/465,004, filed on Feb. 28, 2017, provisional application No. 62/355,176, filed on Jun. 27, 2016.

(51) Int. Cl.

| G06Q 30/06 | (2012.01) |
|---|---|
| G05B 15/02 | (2006.01) |
| G06Q 10/02 | (2012.01) |
| G06Q 20/14 | (2012.01) |
| G06Q 20/20 | (2012.01) |
| G06Q 50/12 | (2012.01) |
| G07C 9/00 | (2006.01) |

(Continued)

(52) U.S. Cl.
CPC ......... *G06Q 30/0645* (2013.01); *G05B 15/02* (2013.01); *G06Q 10/00* (2013.01); *G06Q 10/02* (2013.01); *G06Q 20/14* (2013.01); *G06Q 20/20* (2013.01); *G06Q 50/12* (2013.01); *G07C 9/00166* (2013.01); *H04W 4/04* (2013.01)

(58) Field of Classification Search
None
See application file for complete search history.

(56) References Cited

U.S. PATENT DOCUMENTS 5,614,703 A     3/1997  Martin et al.
6,823,188 B1 *  11/2004  Stern .................... G08G 1/0962
                                         455/41.2

(Continued)

FOREIGN PATENT DOCUMENTS

| CN | 103729817 | 4/2014 |
|---|---|---|
| CN | 104050510 | 9/2014 |

(Continued)

OTHER PUBLICATIONS

International Search Report and Written Opinion, PCT/US2017/039571, filed Jun. 27, 2017, 16 pages.

*Primary Examiner* — Tonya Joseph
(74) *Attorney, Agent, or Firm* — Brownstein Hyatt Farber Schreck, LLP

(57) ABSTRACT

A resource management system for a service industry business includes a recommendation engine that initiates one or more service actions and/or device actions based on inputs from one or more sensors and/or an obtained customer location within a building or facility. The resource management system automatically distributes, assigns, schedules, and/or reserves one or more resources for the benefit of the detected customer based on one or more recommendations of the recommendation engine.

17 Claims, 19 Drawing Sheets

(51) Int. Cl.
*H04W 4/04* (2009.01)
*G06Q 10/00* (2012.01)

(56) References Cited

U.S. PATENT DOCUMENTS

| | | | |
|---|---|---|---|
| 7,315,823 B2 | 1/2008 | Brondrup | |
| 8,903,425 B2 | 12/2014 | Guenec et al. | |
| 9,501,881 B2 | 11/2016 | Saeedi et al. | |
| 9,710,987 B2 | 7/2017 | Scoggins et al. | |
| 9,955,318 B1* | 4/2018 | Scheper | H04W 4/043 |
| 2002/0169643 A1* | 11/2002 | Petite | G06Q 10/02 |
| | | | 705/5 |
| 2003/0149576 A1* | 8/2003 | Sunyich | G06Q 10/02 |
| | | | 705/5 |
| 2005/0033640 A1* | 2/2005 | Mallick | G06Q 30/0267 |
| | | | 705/14.64 |
| 2008/0084860 A1* | 4/2008 | Bloebaum | H04M 1/7253 |
| | | | 370/342 |
| 2012/0089722 A1* | 4/2012 | Enholm | G06Q 10/00 |
| | | | 709/223 |
| 2014/0040509 A1* | 2/2014 | Stedman | G06F 1/1632 |
| | | | 710/8 |
| 2014/0046716 A1* | 2/2014 | Black | G06Q 10/06314 |
| | | | 705/7.19 |
| 2014/0310030 A1* | 10/2014 | Cheranda | G06Q 10/02 |
| | | | 705/5 |
| 2015/0012307 A1* | 1/2015 | Moss | G06Q 10/02 |
| | | | 705/5 |
| 2015/0067792 A1 | 3/2015 | Benoit et al. | |
| 2015/0106296 A1* | 4/2015 | Robinson | G06F 21/62 |
| | | | 705/339 |
| 2016/0086400 A1 | 3/2016 | Dumas et al. | |
| 2016/0127856 A1* | 5/2016 | Link, II | H04W 4/02 |
| | | | 455/41.2 |
| 2016/0180261 A1* | 6/2016 | Rosen | G06Q 10/02 |
| | | | 705/5 |
| 2017/0018183 A1* | 1/2017 | Rosen | G08G 1/015 |
| 2017/0255880 A1* | 9/2017 | Daher | G06Q 10/02 |
| 2018/0033235 A1* | 2/2018 | Dotterweich | G07C 9/00896 |

FOREIGN PATENT DOCUMENTS

| | | | |
|---|---|---|---|
| CN | 104091219 | 10/2014 | |
| WO | WO 2008085684 A1 * | 7/2008 | G06Q 10/02 |
| WO | WO2012116400 | 9/2012 | |
| WO | WO2013049730 | 4/2013 | |
| WO | WO2016011494 | 1/2016 | |
| WO | WO2016065716 | 5/2016 | |

* cited by examiner

SYSTEM AND METHOD FOR AUTOMATED MANAGEMENT OF SERVICE INDUSTRY AND FOR-HIRE RESOURCES

CROSS-REFERENCE TO RELATED APPLICATIONS

This application claims the benefit under 35 U.S.C. § 119(e) of U.S. Provisional Patent Application No. 62/355,176, filed on Jun. 27, 2016, and entitled "Intelligent Physical Action Payment System" and U.S. Provisional Patent Application No. 62/465,004, filed on Feb. 28, 2017, and entitled, "Automated Billing And User Preference Prediction System," the contents of which are incorporated by reference as if fully disclosed herein.

FIELD

Embodiments described herein generally relate to management of service industry resources, and, in particular, to systems and methods for automated management and distribution of service industry and/or for-hire resources.

BACKGROUND

An individual or an organization (herein, a "customer") can engage a service industry business for temporarily use of a good, service, or property. Example service industry businesses can include food or drink service businesses, hospitality businesses, professional services businesses, entertainment or leisure businesses, short-term rental business, and so on.

In many cases, customer loyalty increases with an increase in efficiency that a particular service industry business completes service or for-hire transactions. In other words, the more reliable, consistent, and effortless a transaction is for a customer, the more likely that customer will continue to engage that particular service industry business.

However, service industry businesses typically have limited resources. Inefficient distribution and/or allocation of these resources among multiple customers can decrease transaction efficiencies and reduce customer loyalty.

SUMMARY

Certain embodiments described herein generally reference a service industry resource management system including: an access control device (including a housing for installation adjacent to a rentable space, and a controller within the housing) and an automation engine. The automation engine includes a processor in communication with the controller and a memory configured to store executable instructions executable by the processor. The instructions, when executed by the processor, cause the processor to: determine a location of a device relative to the rentable space; reserve the rentable space for the customer based on the location; cause the controller to permit the customer to access the rentable space based on the location; and initiate billing of the customer for the rentable space upon detecting the device within the rentable space.

BRIEF DESCRIPTION OF THE DRAWINGS

Reference will now be made to representative embodiments illustrated in the accompanying figures. It should be understood that the following descriptions are not intended to limit this disclosure to one preferred embodiment. To the contrary, the disclosure provided herein is intended to cover alternatives, modifications, and equivalents as may be included within the spirit and scope of the described embodiments, and as defined by the appended claims.

Figure 1:
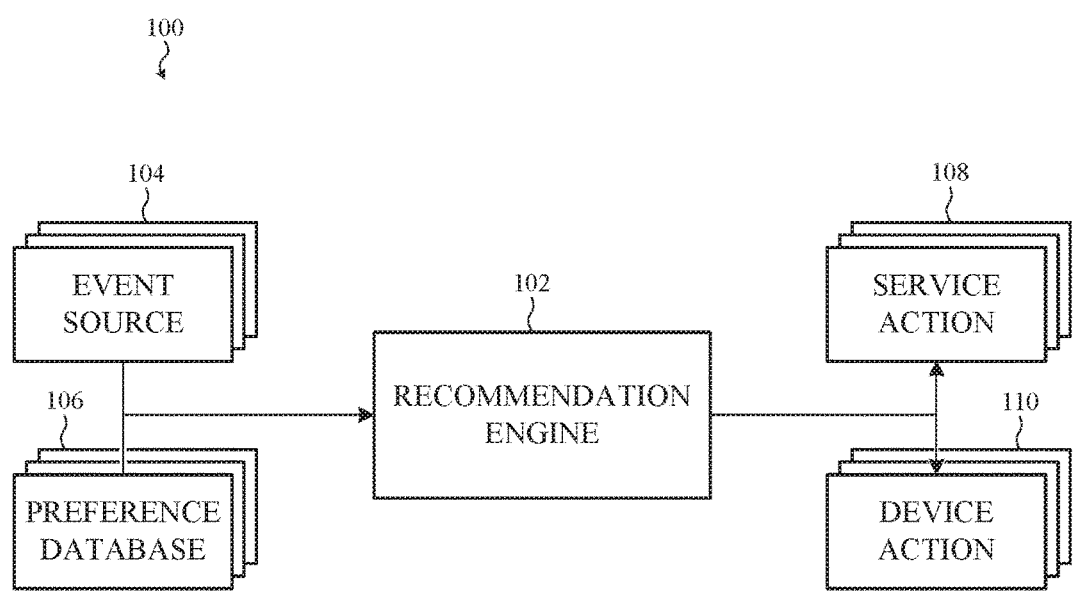
FIG. 1 depicts a simplified signal flow diagram of a service industry resource management system, such as described herein.

The use of the same or similar reference numerals in different figures indicates similar, related, or identical items. Further, it should be understood that the proportions and dimensions (either relative or absolute) of the various features and elements (and collections and groupings thereof) and the boundaries, separations, and positional relationships presented therebetween, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

Embodiments described herein reference systems and methods for automated resource management for service industry businesses. More specifically, embodiments described herein reference resource management systems that automate service transactions (e.g., financial transactions, goods purchases, service purchases, equipment/space rental, and so on) between service industry businesses and service industry customers based on automated and/or intelligence analysis of inputs received from a variety of sensors, databases, and other information sources.

For example, in one embodiment, a resource management system—such as described herein—can be used in a restaurant setting. In this example, the resource management system can be configured to (1) locate and identify a customer nearby the restaurant, (2) access a relational database including information corresponding to that customer's service preferences, and (3) automatically initiate one or more services corresponding to that customer's service preferences. For example, a customer's preferred drink order can be prepared by a bartender, and billed to the customer's tab, after the customer's vehicle is detected nearby the restaurant's valet stand.

More specifically, in this example, the resource management system can include a central server in communication with an induction loop sensor configured to detect the presence of a vehicle on a roadway or in a parking area nearby the valet stand. The central server (or more generally, the "controller") in this example can also be coupled to a video capture system configured for object detection and/or character recognition.

As a result of this construction, a vehicle arriving at the valet stand of the restaurant can be detected by the induction loop which, in turn, can trigger the video capture system to identify the vehicle as one associated with a particular customer. In addition, the induction loop (and/or any control or processing circuitry associated with the induction loop) transmits information information about the detected vehicle to the controller for processing. Such information may include, without limitation: vehicle size, approach speed, curb weight, height, length, and so on.

Once activated, the video capture system can enlist an object detection algorithm to identify a particular vehicle type, size, color, make, or model from a video stream or image obtained from a digital camera oriented to face the valet stand. In addition, or in the alternative, the video capture system can enlist a character recognition algorithm to identify characters of the vehicle's license plate. In still further examples, the video capture system can enlist a face detection and/or a face recognition algorithm to identify a driver or passenger of the vehicle. As with the induction loop, information obtained and/or collected by the video capture system is transmitted to the controller for processing.

After receiving information from the video capture system and/or the induction loop, the controller can query one or more relational databases. For example, the controller may be configured to access one or more first or third party databases (e.g., public databases, private databases, repair databases, dealership databases, social media databases, and so on) to identify the driver or passenger(s) of the vehicle with a particular degree of confidence (e.g., beyond a threshold confidence).

In one example, a relational database includes information that associates particular known customers with particular known vehicles. In this example, a driver of a vehicle may be identified beyond a threshold confidence based on facial recognition and license plate recognition.

In another example, a relational database includes information that associates particular known customers with known companions (e.g., family members, friends, colleagues, and so on). In this example, a passenger of the vehicle may be identified as a companion of the identified driver based facial recognition of the passenger and a known relationship with the identified driver.

In still further embodiments, a relational database may contain information about customers of other restaurants, other restaurant locations, other businesses, and so on. As a result, a customer or passenger visiting a particular restaurant location for the first time may still be identified by the resource management system.

After identifying the customer and any companions of the customer, the controller of the resource management system can access a relational database that associates service preferences (e.g., drink orders, food orders, and so on) with particular customers. Thereafter the controller can generate an order ticket, based on one or more service preferences associated with the identified customer and/or companions of the customer, for the point-of-sale system of the restaurant. The point-of-sale system thereafter notifies the bartender of an open order, and appends that order to the customer's tab.

Accordingly, as a result of the resource management system described above, the customer's wait time is substantially reduced and, in addition, time-consuming interaction with the restaurant's point-of-sale system by the bartender is avoided.

In another embodiment, a resource management system may be supervised by an agent or employee of a service industry business, such as a restaurant. More specifically, a resource management system can be configured to (1) locate and identify a customer nearby or within a building or facility, (2) access a relational database including information corresponding to that customer's service preferences, (3) confirm with the customer or an agent of the service industry business whether a service should be provided, and (4) initiate one or more services corresponding to that customer's service preferences. Continuing the example provided above, a valet may receive a signal (e.g., acoustic signal, visual signal, printed instruction, and so on) automatically from the controller of the resource management system when the customer's vehicle is detected to request whether the customer prefers to place that customer's regular drink order at that time. After confirmation by the customer, the valet—or someone in communication with the valet, such as a manager—may provide an indication to the controller (e.g., voice instruction, visual indication, button press, and so on) that causes the controller to interface with the restaurant's point-of-sale system, as described above.

It may be appreciated, however, that a restaurant is merely one example of a service industry business. As used herein, the phrase "service industry business" refers, generally, to any entity or organization that provides access to temporary use of one or more resources (e.g., goods, services, real property, or personal property) to a customer. Example service industry business include, without limitation: food service businesses (e.g., restaurants, cafes, and so on); drink service businesses (e.g., coffee shops, bars, and so on); hospitality businesses (e.g., hotels, event spaces, and so on); entertainment and leisure businesses (e.g., casinos, clubhouses, movie theaters, and so on); rental businesses (e.g., co-working spaces, equipment rental, and so on); and so on. For simplicity of description, the term "business" is used herein interchangeably with the phrase "service industry business."

In many embodiments, a resource management system can be configured to provide multiple services to a particular customer of a particular business without intervention. For example, a resource management system, such as described herein, can configured to (1) locate and identify a customer within a building or facility, (2) determine a proximity of that customer to an available resource within that facility, (3) access a relational database including information corresponding to that customer's service preferences and/or corresponding to the available resource, and (4) initiate one or more services and/or activate one or more devices corresponding to that customer's service preferences and corresponding to the available resource.

For example, a resource management system for a health services organization may be configured to locate and identify a mobile phone or key fob of one or more clients (herein, "customers"). As an identified customer approaches a receptionist desk, the resource management system can, without limitation: access the customer's file; display the customer's file and/or information to a receptionist or office assistant; check the customer in for an appointment; schedule an appointment for the customer; retrieve a prescription and/or current diagnosis of the customer; schedule a visit to a patient; and so on.

In another example, a resource management system of a for-hire temporary workspace (more commonly, a "co-working space") may be configured to locate and identify a mobile phone of one or more customers. As an identified customer approaches a rentable office within the co-working space, the resource management system can, for example, and without limitation: reserve the rentable office for the customer (hereafter, a "reserved office"); unlock the door to the reserved office; open the door to the reserved office; change one or more environmental settings (e.g., lighting, temperature, humidity, privacy shades, and so on) of the reserved office based on the customer's preferences; display a welcome message to the customer within and/or outside the reserved office; prepare to initiate a video conference or telephone call; begin brewing coffee according to the customer's preferences; schedule an order of drink or food for delivery to the office based on the customer's preferences and the current time; update a social media, telephone, or calendar status for the customer; schedule delivery of packages or mail to the customer in the office; configure peripheral device or equipment to be used by the customer (e.g., printers, scanners, telephones, desk height, chair height, and so on); and so on. Thereafter, once the customer is within the reserved office, the resource management system can begin billing an account associated with the customer for use of the office. In some cases, the resource management system may also send a notification to the customer's mobile phone to inform the customer that billing for the office has begun. Once the customer vacates the reserved office, the resource management system can stop billing the customer's account for use of the office.

In another example, a resource management system of a co-working space may be configured to locate and identify a key fob of one or more customers. As an identified customer approaches certain equipment within the co-working space, the resource management system can automatically configure the equipment for use by the customer.

In another example, the resource management system of the co-working space may be configured to monitor the customer's proximity to a conference room by monitoring security cameras within the co-working space. Once the customer is nearby the conference room, the resource management system may unlock the conference room, adjust the lighting of the conference room to the customer's preferences, adjust the temperature and humidity of the conference room to the customer's preferences, and initiate an order for water and/or coffee to be delivered to the conference room according to the customer's preferences. The resource management system can also reserve the conference room under the customer's name, preventing other customer's from interrupting the custom when the customer is within the conference room. In still further examples, the resource management system is configured to reconfigure equipment within the conference room according to the customer's preferences. For example, the resource management system may reconfigure a speakerphone in the conference room to the customer's number. In another example, the resource management system may reconfigure a video conference system to the customer's specifications.

In another example, the resource management system of the co-working space may be configured to monitor the customer's proximity to a scanner. Once the customer is nearby the scanner, the resource management system may configure the scanner to send copies of all scanned documents to an address associated with the customer.

In another example, the resource management system of the co-working space may be configured to monitor the customer's proximity to a printer. Once the customer is nearby the printer, the resource management system may instruct the printer to release a print job enqueued by the customer.

In yet another example, the resource management system of the co-working space may be configured to monitor the customer's proximity to a vending machine. Once the customer is nearby the vending machine, the resource management system may configure the vending machine to process a transaction for the customer's preferred beverage or snack.

In yet another example, the resource management system of the co-working space may be configured to monitor the customer's proximity to a café within the co-working space. Once the customer is nearby the café, the resource management system may instruct the point-of-sale system of the café to open a tab for the customer. Once the tab is opened (which may not be required), a welcome message can be displayed for the customer and/or for an employee of the café.

Continuing the example, the resource management system of the co-working space can access a relational database containing information about the customer's food preferences, order history, and/or allergies. Thereafter, the resource management system can adjust a displayed menu based on output from the relational database. For example, if the customer is allergic to a certain ingredient, all menu items that contain the ingredient or may contain the ingredient can be hidden, deemphasized, or adjusted to replace the ingredient with alternatives. In another example, if the customer consistently places a particular order, the resource management system may instruct the point-of-sale system of the café to generate an order ticket for the customer's preferred order.

The foregoing examples describe above, and the various alternatives thereof and variations thereto are presented, generally, for purposes of explanation, and to facilitate an understanding of various configurations and uses of a system, such as described herein. However, it will be apparent to one skilled in the art that some of the specific details presented herein may not be required in order to practice a particular described embodiment, or an equivalent thereof. Similarly, it will be apparent to one skilled in the art that the systems described herein can be modified, adjusted, or otherwise adapted to different service industry businesses than those described above.

For example, certain detailed embodiments are discussed below with reference to FIGS. 1-11. However, those skilled in the art will readily appreciate that the detailed description given herein with respect to these figures is for explanation only and should not be construed as limiting.

For example, FIG. 1 generally and broadly depicts a simplified signal flow diagram of an example service industry resource management system, such as described herein. The resource management system may be configured for use by any number of suitable service industry businesses. For simplicity of description, the embodiments that follow reference a co-working space, although it may be appreciated that this is merely one example. In other cases, a resource management system (such as described herein) can be suitably modified for and used by, without limitation: restaurants, bars, cafes, retail businesses, financial institutions, professional services organizations, casinos, theaters, entertainment businesses, hospitals, pharmacies, and so on.

FIG. 1 depicts a resource management system 100 configured to manage the distribution, allocation, assignment, and/or scheduling of resources of a co-working space in order to more efficiently and quickly provide services to customers of that co-working space.

Example resources of a co-working space can include, but may not be limited to: rentable office space; rentable desk space; rentable office equipment (e.g., printers, scanners, telephones, and so on); teleconference equipment; internet access; television service; resources associated with delivery and mail services (e.g., personnel); resources associated with food and beverage services (e.g., personnel, preparation equipment, delivery equipment); resources associated with receptionist and/or call handling services; parking spaces; resources associated with valet services; resources associated with medical services; and so on. As noted with respect to other embodiments described herein, efficient and timely management, distribution, and allocation of these (and/or other) resources among multiple customers can increase customer loyalty and decrease transaction time.

In the illustrated embodiment, the resource management system 100 includes a recommendation engine 102 (or, alternatively: decision engine, prediction engine, control engine, statistical engine, artificial intelligence engine, state detection system, and so on) that receives input from one or more event sources and one or more databases.

For simplicity of illustration, one example event source is identified as the event source 104 and one example database is identified as the preference database 106. It may be appreciated, however, that multiple event sources can provide input to the recommendation engine 102. Similarly, it may be appreciated that multiple databases can provide input to the recommendation engine 102.

Generally and broadly, the recommendation engine 102 is configured to receive inputs from a variety of sources (e.g., including the event source 104 and the preference database 106), to process information received from those inputs, and to generate one or more service recommendations based on the processed information. The service recommendations generated by the recommendation engine 102 can thereafter be passed (e.g., transmitted) to one or more controllers to provide the recommended services. For example, in the illustrated embodiment, the service recommendations generated by the recommendation engine 102 are transmitted to one or more service action controllers and/or one or more device action controllers. For simplicity of illustration, one service action controller is identified as the service action controller 108 and one device action controller is identified as the device action controller 110.

Generally and broadly, a service action controller, such as the service action controller 108, is configured to initiate a process to directly provide or more services to a customer within the co-working space. For example, the service action controller 108 can be configured to reserve an office or desk, generate a drink order ticket, begin billing the customer for use of an office or equipment, and so on.

Conversely, generally and broadly, a device action controller, such as the device action controller 110, is configured to initiate a process to change a property or state of a physical device within, or associated with, the co-working space. In many cases, the state of the physical device is ancillary to a service initiated by the service action controller 108, but this may not be required. For example, the device action controller 110 can be configured to lock or unlock doors, lock or unlock equipment, open or close doors or windows, modify environmental settings, and so on in response to the service action controller 108 reserving an office for the customer.

In the illustrated example, the recommendation engine 102 receives input in the form of an event reported by the event source 104. As noted above, the event source 104 can be any suitable event source such as, but not limited to: a sensor; a local server; a remote server; a software program; a customer; a customer device; an agent or employee of the co-working space; and so on.

For example, in one embodiment, the event source 104 is a software sensor. The software sensor may be associated with (e.g., operated on) a local server, a remote server, a third party server, or any other electronic device capable of operating software. As one example, the event source 104 can generate a software event based on, without limitation: the time of day; the date; an amount of time elapsed from a previous event; completion or progress of a software task; a notification (sent, received, or brokered); a message (sent, received, or brokered); and so on. Such events are generally referred to herein as "software events."

In another example, the event source 104 is a hardware sensor, such as a door closure sensor. In this example, the event source 104 can generate an event based on whether a particular door is open or closed. In one particular example, the event source 104 generates an event for the recommendation engine 102 every time a door is opened or closed. In another example, the event source 104 generates an event for the recommendation engine 102 whenever a door has remained closed or has remained open for a certain period of time. In other related examples, the event source 104 can be any suitable hardware sensor such as, but not limited to: window closure sensors, garage closure sensors, turnstile sensors, door locks, window locks, motion sensors, temperature sensors, humidity sensors, fluid sensors, leak sensors, presence sensors, occupancy sensors, weather sensors, a vehicle sensor; and so on. Such events are generally referred to herein as "hardware events."

In yet another example, the event source 104 can be a device owned and operated by a particular customer. In this example, the event source 104 can be, without limitation: a personal electronic device (e.g., a mobile phone, laptop computer, desktop computer, and so on); a personal radio frequency identification key fob, a personal wireless identification tag (e.g., Bluetooth or Near-Field Communication device), and so on. The event generated by the event source 104 can be associated with, without limitation: movement of the customer within the co-working space; arrival of the customer within the co-working space; arrival of the customer within a particular area of the co-working space; and so on. Such events are generally referred to herein as "location events" or "movement events." Location events and/or movement events that occur and/or are detected within a particular building or facility (e.g., a customer moving from one room to another room, or from one desk to another desk, and so on) are generally referred to herein as "site events."

In yet another example, the event generated by the event source 104 can be associated with an instruction or confirmation provided by the customer to the recommendation engine 102 via the customer's device (e.g., via an application operating on the customer's device). In some examples, the customer may provide an instruction to, without limitation: request a particular service action or device action to be performed or initiated; request that a particular service action or device action not be performed; request that a particular service action or device action be terminated or canceled; and so on. Such events are generally referred to herein as "customer instruction events."

In yet another example, the event source 104 can be a device operated by an agent or employee of the co-working space. In this example, the event source 104 can be, without limitation: an electronic device (e.g., a mobile phone, laptop computer, desktop computer, and so on); a radio frequency identification key fob, a wireless identification tag (e.g., Bluetooth or Near-Field Communication device), and so on. The event generated by the event source 104 can be associated with an instruction or confirmation provided by the agent or employee to the recommendation engine 102. In some examples, as with customer instruction events, the agent or employee may provide an instruction to, without limitation: request a particular service action or device action to be performed or initiated; request that a particular service action or device action not be performed; request that a particular service action or device action be terminated or canceled; and so on. Such events are generally referred to herein as "internal instruction events."

In still further examples, the event source 104 can be a software event or a hardware event that corresponds to an aggregation of other events or device states. For example, the event can be a combined state of multiple hardware devices, a combined state of multiple software states, and so on. In one specific example, the resource management system 100 can be coupled to or in communication with a video capture system such as described above. The video captures system can aggregate information obtained from and/or extracted from a digital image feed. For example, as noted above, a video capture system can be configured to identify a customer based on facial recognition and license plate recognition. In this example, the video capture system of the resource management system 100 may report to the recommendation engine 102 that a particular customer is present. In this example the "presence" of the customer corresponds to aggregation and processing of information received from multiple sources, namely a facial recognition algorithm output and a license plate recognition algorithm output. Such events are generally referred to herein as "aggregated events."

Additionally, in the illustrated example, the processor of the recommendation engine 102 receives input from one or more databases, such as the preference database 110. Other suitable databases can include, without limitation: vehicle databases, health databases, allergy databases, account databases, and so on. Input received by the recommendation engine 102 from one or more databases is referred to herein as "database query results."

In many cases, in order to receive events (e.g., software events, hardware events, movement events, location events, site events, customer instruction events, internal instruction events, aggregated events, and so on) and database query results, the recommendation engine 102 includes at least one processor and a memory.

The processor can be implemented with any electronic device or component capable of processing, receiving, or transmitting data or instructions in an analog and/or digital domain. For example, the processor can be a microprocessor, a central processing unit, an application-specific integrated circuit, a field-programmable gate array, a digital signal processor, an analog circuit, a digital circuit, or combination of such devices. The processor may be a single-thread or multi-thread processor. The processor may be a single-core or multi-core processor.

Accordingly, as described herein, the term "processor" refers to a hardware-implemented data processing device or circuit physically structured to execute specific transformations of data, including data operations represented as code and/or instructions included in a program that can be stored within and accessed from an integrated or separate memory. The term is meant to encompass a single processor or processing unit, multiple processors, multiple processing units, analog or digital circuits, or other suitably configured computing element or combination of elements.

Once one or more events and/or database query results are received, the processor of the recommendation engine 102 is configured to execute one or more artificial intelligence algorithms, operations, or processes (e.g., decision trees, state machines, genetic or evolutionary algorithms, machine learning algorithms, support vector machine algorithms, neural networks, Bayesian networks, and so on) to generate one or more service recommendations or operations for the resource management system 100 to perform by transmitting instructions to one or more device action controllers and/or one or more service action controllers, such as the service action controller 108 and the device action controller 110.

It may be appreciated, however, that the particular algorithm or set of algorithms selected to be executed by the processor of the recommendation engine 102 may vary from embodiment to embodiment. For example, in some embodiments, a Bayesian network may generate more accurate and/or efficient recommendations than a decision tree or a state machine. As such, it may be appreciated that a specific algorithm or set of algorithms may not be required for all embodiments.

Generally and broadly, FIGS. 2A-2D depict system diagrams of various systems and subsystems of a resource management system such as described herein. As noted with respect to other embodiments described herein, the resource management system can be associated with any number of suitable service industry businesses. However as with the embodiment depicted in FIG. 1, for simplicity of description, the embodiments that follow reference a resource management system for use in a co-working space.

Figure 2A:
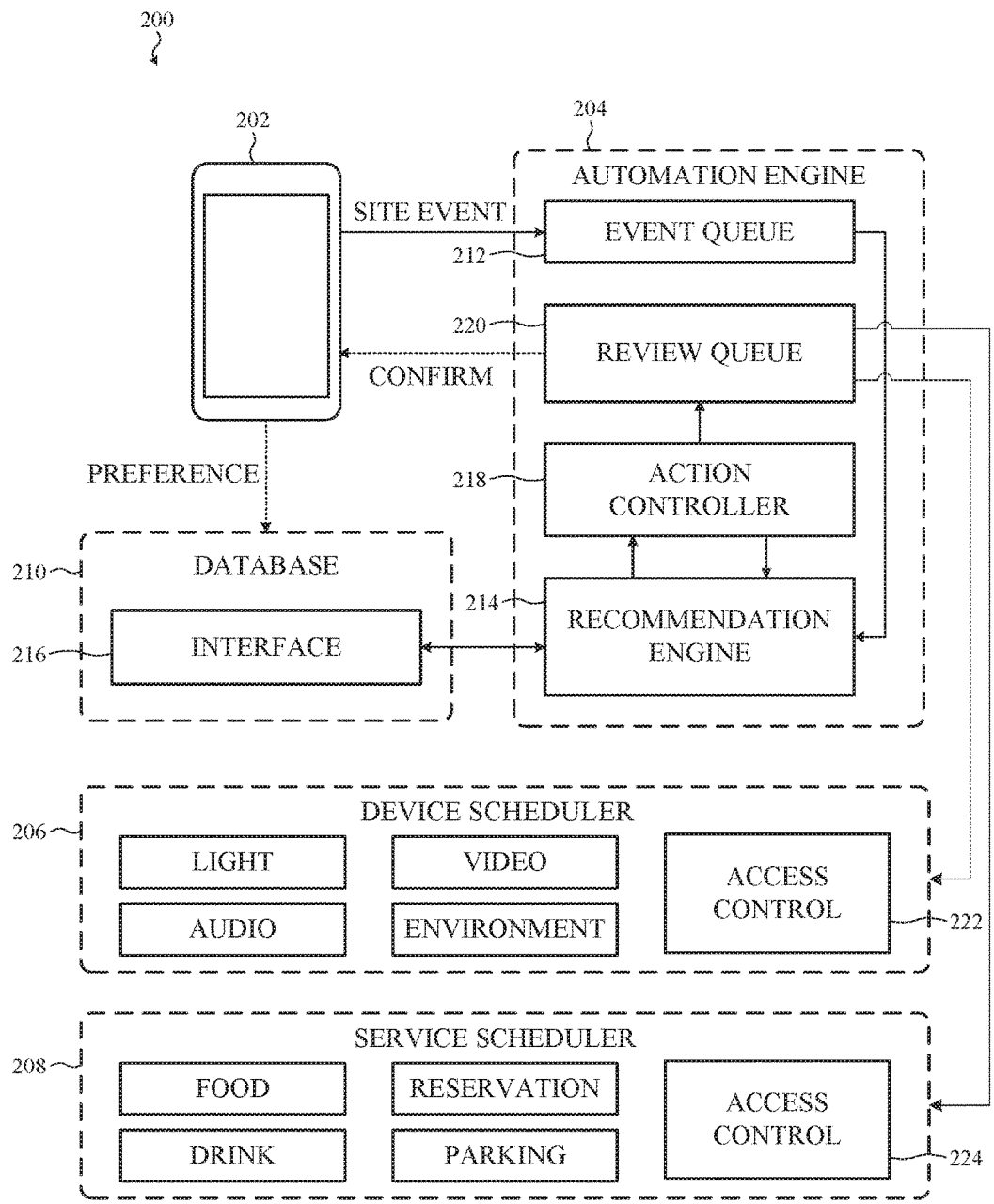
FIG. 2A depicts a system diagram of a resource management system, such as described herein.

FIG. 2A depicts a system diagram of a resource management system of a co-working space, such as described herein. The resource management system 200 in this embodiment is in communication with a customer device 202. In typical examples, the resource management system 200 and the customer device 202 are in wireless two-way communication (e.g., Bluetooth, Wi-Fi, and so on), but this may not be required. For example, in some embodiments, the customer device 202 generates a beacon or identification signal (e.g., radio-frequency identification signals, near-field communications, Bluetooth Low Energy, and so on) that is received and processed by the resource management system 200.

In other examples, the resource management system 200 can transact information with the customer device 202 in order to provide one or more services to the customer associated with the customer device 202. For example, the resource management system 200 may be configured to request permission from the customer device 202 to perform a particular service (e.g., submit an order ticket for food or drink, reserve an office or meeting space, and so on).

In another example, the resource management system 200 may be configured to notify the customer device 202 when a service is performed (e.g., billing begins, a reservation is placed, a previously-unavailable office or equipment is available for use, and so on). In yet other examples, the resource management system 200 may be configured to track, locate, and/or identify the customer device 202 within the co-working space.

In typical examples, the customer device 202 includes a housing to retain, support, and/or enclose various components of the customer device 202, such as a display. The display may include a stack of multiple layers (e.g., a display stack) including, for example, and in no particular order: an organic light emitting diode layer, a touch input layer, a force input layer, and so on. Other embodiments can implement the display in a different manner, such as with liquid crystal display technology, electronic ink technology, quantum dot technology, and so on.

The display can be a planar display, wrap-around display, a bezel-less display, a reduced bezel display, a curved display, a rectilinear display, or any other suitable display. In some cases, the display is flexible.

In many embodiments, the display is positioned behind a protective outer layer that defines an interface surface above an active display area of the display. The active display area of the display is typically characterized by a distribution of individually-controllable pixels or pixel elements. In the illustrated example, the active display area of the display can be understood to be within the rectangular line boundary of the display.

The customer device 202 can also include a processor, memory, power supply and/or battery, network connections, sensors, input/output ports, acoustic elements, haptic elements, digital and/or analog circuits for performing and/or coordinating tasks of the customer device 202, and so on. For simplicity of illustration, the customer device 202 is depicted in FIG. 2A without many of these elements, each of which may be included, partially and/or entirely, within the housing and may be operationally or functionally associated with, or coupled to, the display.

Furthermore, although illustrated as a cellular phone, the customer device 202 can be another customer device 202 that is either stationary or portable, taking a larger or smaller form factor than illustrated. For example, in certain embodiments (and as noted above), the customer device 202 can be a laptop computer, a tablet computer, a wearable device, a health monitoring device, a home or building automation device, a home or building appliance, a craft or vehicle entertainment, control, and/or information system, a navigation device, and so on.

Figure 2B:
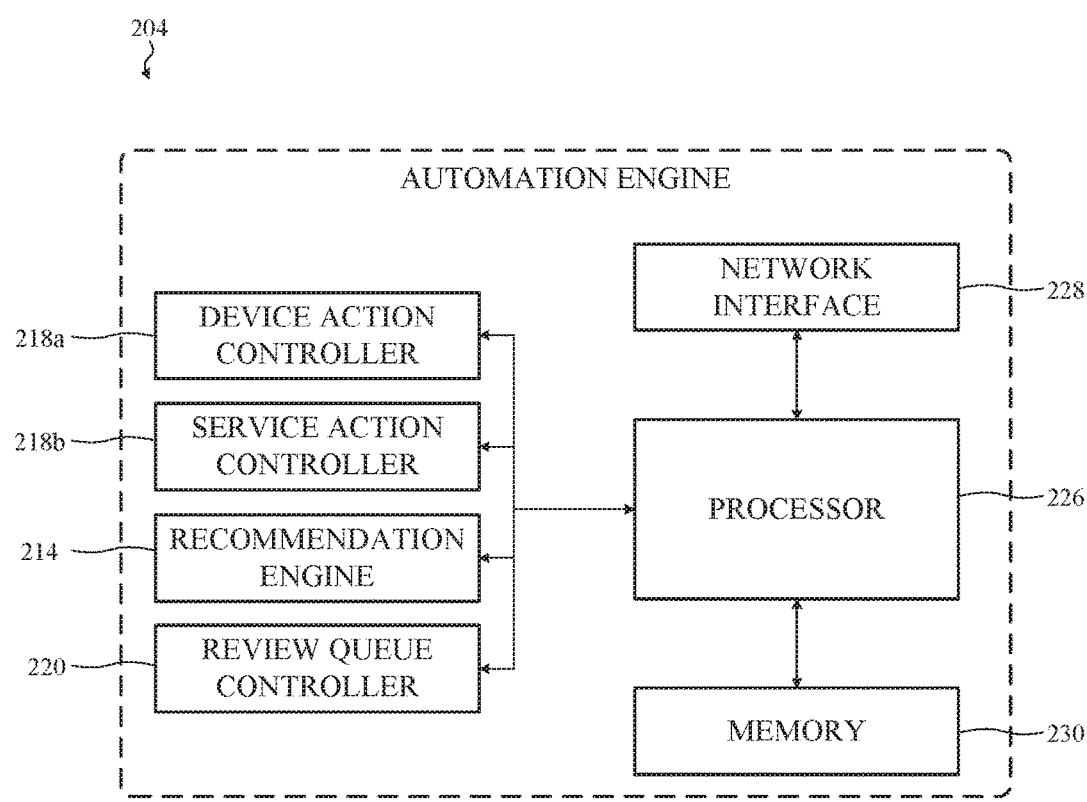
FIG. 2B depicts a system diagram of an automation engine associated with the resource management system depicted in FIG. 2A.

The resource management system 200 also includes an automation engine 204 (see, e.g., FIG. 2B). The automation engine 204 is in communication with the customer device 202. For example, the automation engine 204 can be configured to receive site events from the customer device 202. In other cases, the automation engine 204 can be configured to receive other events from the customer device 202 such as, but not limited to: software events; hardware events; movement events; location events; customer instruction events; internal instruction events; aggregated events; and so on.

The automation engine 204 is additionally coupled to a device scheduler 206, a service scheduler 208, and a database 210.

The automation engine 204 can be implemented in any number of suitable ways. In many cases, the automation engine 204 is implemented on a server including at least a processor and a memory. Other configurations may be suitable.

In the illustrated embodiment, site events (or other events) generated or transmitted by the customer device 202 are received by the automation engine 204 in an event queue 212. The event queue 212 can be implemented in any number of suitable ways, but in many embodiments, the event queue 212 is a message queue (e.g., asynchronous queue).

In many embodiments, the event queue 212 can receive events from other devices or software services as well. For example, the event queue 212 can be communicably coupled to any number of hardware devices, sensors, servers, or systems. In one example, the event queue 212 is connected to a building automation or building security system that submits aggregated events corresponding to building security or automation states (e.g., secure or non-secure, occupied or not occupied, and so on). It may be appreciated that the event queue 212 can receive and enqueue events from any number of sources.

Events received by the event queue 212 are typically serialized (although this may not be required) and passed to a recommendation engine 214. The recommendation engine 214 can be configured as described with respect to other embodiments presented herein (see, e.g., the recommendation engine 102 in FIG. 1). As with other embodiments described herein, the recommendation engine 214 is in communication with the database 210. More specifically, the recommendation engine 214 is configured to submit queries to a database interface 216. The database interface 216 processes the queries submitted by the recommendation engine 214 and returns results to the recommendation engine 214.

Typically, the database 210 stores information relating customers to particular preferences, such as food or drink preferences, environmental preferences, equipment configuration preferences and so on. In some examples, customer preferences can be added to the database 210 directly from the customer device 202. In other cases, customer preferences can be determined over time based on predictions generated by the recommendation engine 214 or another system associated with the automation engine 204. In still further embodiments, customer preferences can be determined after aggregating data associated with the customer from a variety of sources including, but not limited to: vehicle databases, social media databases, customer order history, customer demographics, and so on.

In other cases, the database 110 may not contain customer preference data. For example, in some embodiments, the database 210 can store other information such as, but not limited to: customer relationships; vehicle information; customer identity information; customer allergy information; customer health information; customer billing rate information; customer account information; customer subscription information; customer history; customer order history; information associated with other service industry business; and so on. In many examples, the database 210 is local to (or implemented within) the automation engine 204, but this may not be required. More particularly, the database 210 can be a remote database such as, but not limited to: public databases, private databases, third party databases, machine learning weight databases, vehicle databases, social media databases, and so on.

Once the recommendation engine 214 has processed events received from the event queue 212 and database 210, a recommendation is determined by enlisting a suitable processing algorithm, such as those referenced above. As described with respect to other embodiments described herein, a recommendation can include one or more service actions and/or one or more device actions. Service actions and device actions may be related or independent.

In one example, the recommendation engine 214 receives an enqueued site event from the customer device 202 that indicates that the customer is approaching an already-reserved desk within the co-working space. In response, the recommendation engine 214 can query the database 210 to determine whether the already-reserved desk has been reserved for the benefit of that customer. Upon determining that the desk is not available to the customer (e.g., the desk has been reserved by another customer), the recommendation engine 214 can generate a recommendation to reserve a different desk for the customer.

In another example, the recommendation engine 214 receives an enqueued site event from the customer device 202 that indicates that the customer is approaching a café within the co-working space. In response, the recommendation engine 214 can query the database 210 to obtain an order history for the customer. In other examples, the recommendation engine 214 queries the database 210 to obtain an order preference for the café. Upon determining an order preference and/or upon determining a likely order (e.g., an order predicted by the recommendation engine 214 beyond a threshold confidence), the recommendation engine 214 can generate a recommendation to generate an order ticket with the café's point-of-sale system.

In another example, the recommendation engine 214 receives an enqueued site event from the customer device 202 that indicates that the customer is approaching a rentable office space within the co-working space. In response, the recommendation engine 214 can query the database 210 to obtain the customer's preferences for an office. Such preferences may include: lighting preferences; temperature preferences; social media status preferences; telephone routing preferences; teleconference routing preferences; mail delivery preferences; food or drink delivery scheduling and/or ordering preferences; and so on. Upon determining one or more office preferences, the recommendation engine 214 can generate a recommendation to: reserve the office space; change one or more environmental settings or states of the office; schedule one or more deliveries; and so on.

Figure 2C:
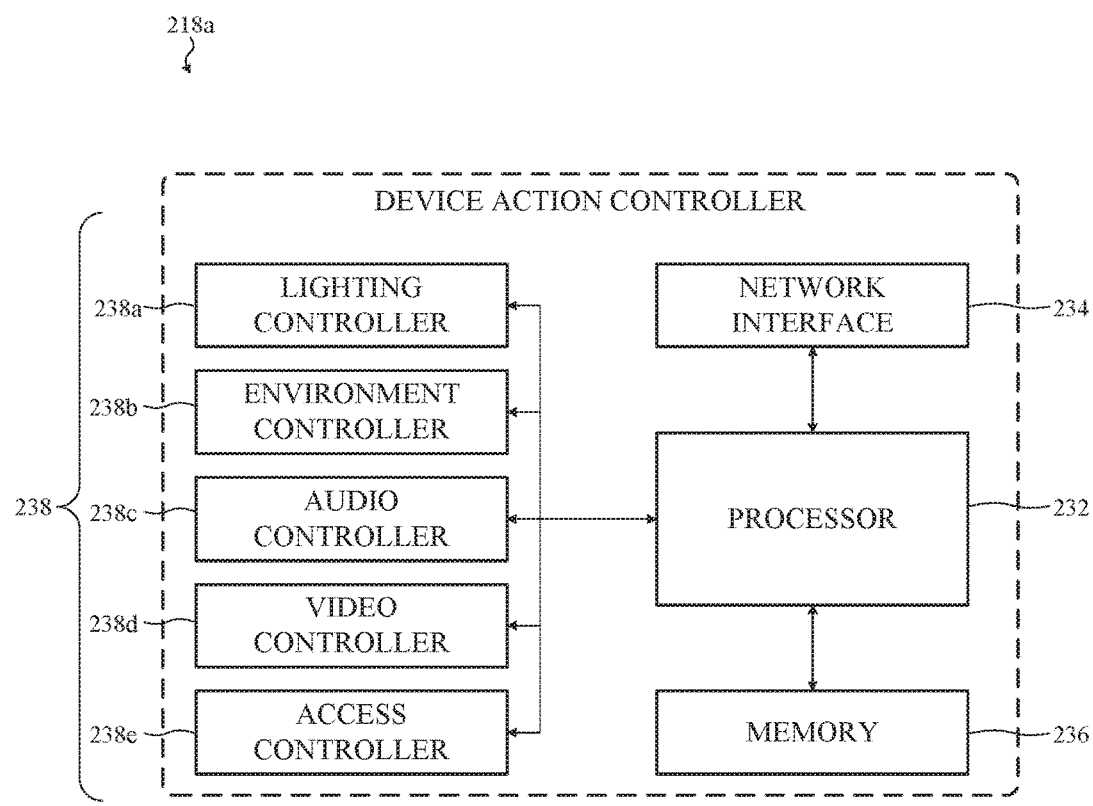
FIG. 2C depicts a system diagram of a device controller associated with the resource management system depicted in FIG. 2A.
Figure 2D:
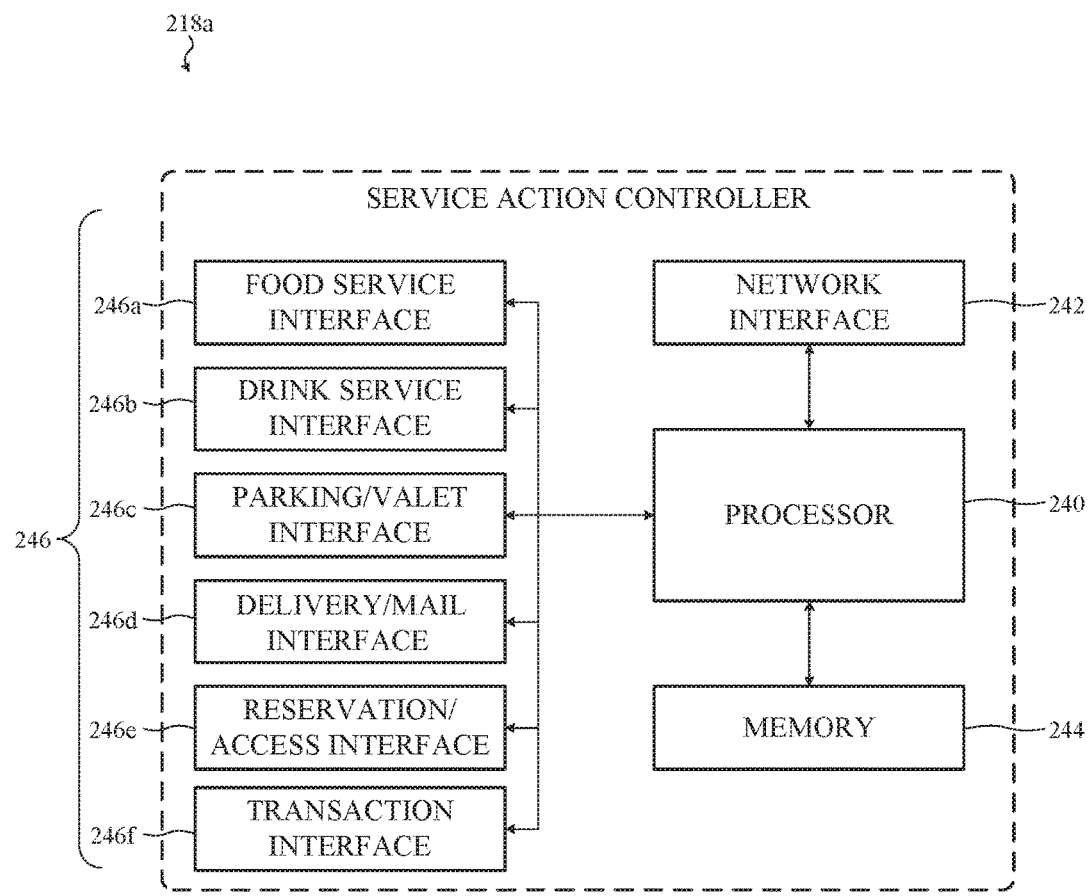
FIG. 2D depicts a system diagram of a service controller associated with the resource management system depicted in FIG. 2A.

Recommended service actions and device actions generated by the recommendation engine 214 are forwarded to an action controller 218 (see, e.g., FIGS. 2C-2D). The action controller 218 is configured to determine a series of steps, actions, or operations to perform or initiate in order to provide the service actions and device actions recommended by the recommendation engine 214. The action controller 218 is communicably coupled to the service scheduler 208 and the device action controller 216. More particularly, the action controller 218 includes a device action controller 218b (see, e.g., FIG. 2C) communicably coupled to the device scheduler 206 and a service action controller 218b (see, e.g., FIG. 2D) coupled to the service scheduler 208

In some embodiments, the action controller 218 can be communicably coupled to a review queue 220. The review queue 220 may be configured to govern which actions and/or sequences of actions output from the action controller 218 should be performed. For example, on one embodiment, the review queue 220 may request permission to proceed from the customer device 202. In other cases, the review queue may request permission to proceed from one or more employees of the co-working space.

Once an action within the review queue 220 is approved (if needed), that action can be passed to one of the service scheduler 208 or the device scheduler 206. As described with respect to other embodiments described herein, the service scheduler 208 may be configured to initiate or schedule a process to complete a service for the benefit of the customer. The process can include scheduling or ordering food, drinks, parking, valet services, equipment or office space reservations and so on. Similarly, as described with respect to other embodiments described herein, the device scheduler 206 may be configured to change a state of one or more devices within the co-working space. In many examples the device scheduler 206 can be configured to change a state of a physical device associated with—or ancillary to—a service initiated by the service scheduler 208. Example devices controlled by the device scheduler 206 can include lighting devices, audio devices, environmental devices, video devices, and so on.

For example, in one embodiment, the recommendation engine 214 receives a site event from the customer device 202 that indicates the customer has arrived at the co-working space. After accessing the database 210, the recommendation engine 214 may determine that the customer has already reserved an office and, additionally, that the customer prefers the office lights to be dim and the office temperature to be set low. These recommendations correspond to discrete actions enqueued in the action controller 218.

In one example, the discrete actions may include, without limitation: instructing the device scheduler 206 to dim the lights to the customer's preferred level; instructing the device scheduler 206 to lower the temperature of the office to the customer's preferred level; instructing the device scheduler 206 to unlock the office door (e.g., the access control 224); and so on.

In another example, the discrete actions may include, without limitation: instructing the device scheduler 206 to dim the lights to the customer's preferred level; instructing the device action controller to lower the temperature of the office to the customer's preferred level; instructing the service scheduler 208 to instruct a building access control system (such as the access control 224) to permit the customer's access card to unlock the office door; and so on.

FIG. 2B depicts a system diagram of the automation engine 204 associated with the resource management system 200 depicted in FIG. 2A. In particular, as illustrated, the automation engine 204 includes a processor 226 in communication with a network interface 228 and a memory 230. The processor 226, memory 230, and network interface 228 can be configured as described with respect to other embodiments presented here. The network interface 228 may be a wired or wireless interface.

The processor 226 of the automation engine 204 is configured to control, monitor, or coordinate communications to the recommendation engine 214, the review queue 220, and to the action controller 218. In this example, the action controller 218 is separated into a device action controller 218a and a service action controller 218b. As noted with respect to other embodiments described herein, the device action controller 218a is configured to change one or more states of one or more devices (e.g., lighting devices, audio devices, video devices, environmental devices, and so on) and the service action controller 218b is configured to initiate one or more processes associated with services provided by the co-working space.

For example, FIG. 2C depicts a system diagram of the device action controller 218a. As with the automation controller 204, the device action controller 218a includes a processor 232, a network interface 234, and a memory 236.

The processor 232 of the device action controller 218a can be coupled to any number of individual device controllers 238, such as a lighting controller 238a, an environment controller 238b, an audio controller 238c, a video controller 238d, and an access controller 238e.

In many embodiments, the lighting controller 238a can be configured to control lighting in one or more locations of the co-working space. For example, the lighting controller 238a can be configured to increase brightness, decrease brightness, or change color temperature of one or more lights, groups of lights, or fixtures of lights. In some examples, the lighting controller 238a is configured to change a color of one or more lights. The lighting controller 238a can communicate with individual lights or individual light circuits wirelessly or via a wired communication interface (e.g., powerline communication). In some cases, the lighting controller 238a can communicate with one or more lights using an industry standard automation protocol such as, but not limited to: Wi-Fi, Bluetooth, ZigBee, Z-Wave, or 433 MHz communication. In some cases, the lighting controller 238a communicates with one or more lights over a proprietary or custom communication protocol operating in a licensed or unlicensed frequency band. Accordingly, generally and broadly, it is appreciated that the lighting controller 238a can communicate with one or more lights in any suitable fashion.

In many embodiments, the environment controller 238b can be configured to adjust a state or status of devices that influence one or more environmental characteristics of an area or subarea of the co-working space. For example, the environment controller 238b can be communicably coupled (via a wireless or wired connection) to one or more: thermostats, humidifiers, dehumidifiers, automated blinds, automated shades, automated awnings, automated fans, heated floors, window transparency, and so on. The environment controller 238b can be configured to communicate with these (and other) devices via standard or custom protocols or communication interfaces. The environment controller 238b is accordingly able to adjust environmental settings—in one or more locations—such as temperature, humidity, airflow, air circulation, and so on by communicating instructions to one or more of the devices or controllers identified above.

In many embodiments, the audio controller 238c can be configured to adjust acoustic and/or audio properties or effects in an area or subarea of the co-working space. For example, the audio controller 238c can be associated with teleconference equipment, telephone equipment, alarm equipment, background noise-generating equipment, or music playback equipment.

In many embodiments, the video controller 238d can be configured to adjust video properties or effects in an area or subarea of the co-working space. For example, the video controller 238d can be associated with a video monitor, a computer monitor, a videoconferencing monitor, a television, a projection system, and so on.

In many embodiments, the access controller 238e can be configured to allow or deny access to particular areas or subareas of the co-working space. For example, the access controller 238e can be associated with a door lock, a window lock, an access control panel, a biometric identification system, a badged access system, a desk locking system, a computer locking system, and so on.

FIG. 2D depicts a system diagram of the service action controller 218b. As with other embodiments described herein, the service action controller 218b includes a processor 240, a network interface 242, and a memory 244. The processor 240 can be communicable coupled to a number of interfaces (e.g., application programming interfaces, hardware interfaces, and so on) each associated with a different service that can be provided to customers of the co-working space. For example, the processor 240 can be coupled to a food service interface 246a (e.g., a point-of-sale system), a drink service interface 246b (e.g., a point-of-sale system), a parking/valet interface 246c, a delivery/mail scheduling interface 246d, a reservation/access interface 246e, a transaction interface 246f, and so on.

The foregoing examples describe above, and the various alternatives thereof and variations thereto are presented, generally, for purposes of explanation, and to facilitate an understanding of various configurations and uses of a system, such as described herein. However, it will be apparent to one skilled in the art that some of the specific details presented herein may not be required in order to practice a particular described embodiment, or an equivalent thereof. Similarly, it will be apparent to one skilled in the art that the systems described herein can be modified, adjusted, or otherwise adapted to different service industry businesses than those described above.

Generally and broadly, FIGS. 3A-3D depict system diagrams of various systems and subsystems of a resource management system such as described herein. As noted with respect to other embodiments described herein, the resource management system can be associated with any number of suitable service industry businesses. However, as with the embodiment depicted in FIG. 1 and FIGS. 2A-2D, for simplicity of description, the embodiments that follow reference a resource management system for use in a co-working space.

Figure 3A:
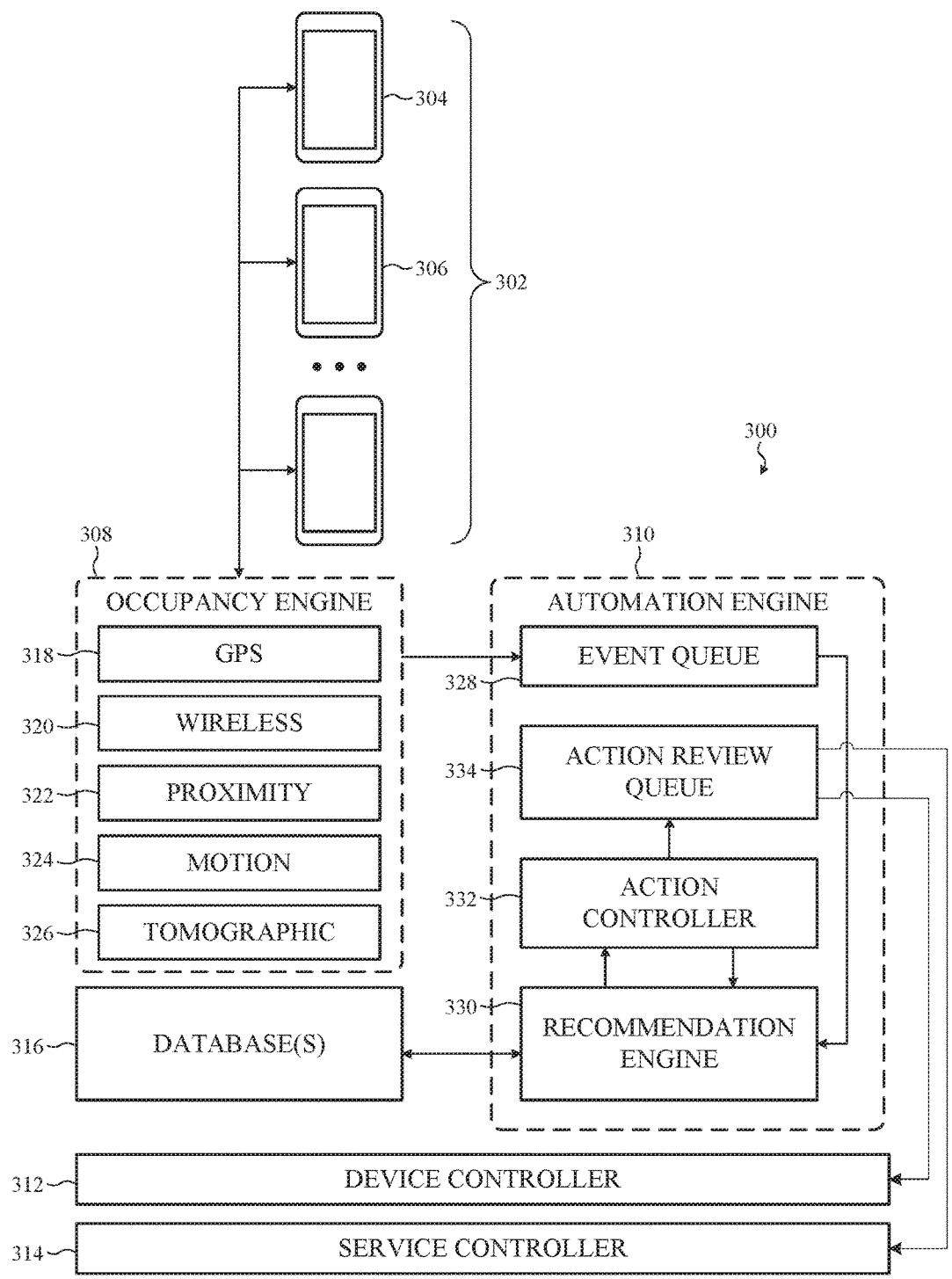
FIG. 3A depicts a system diagram of an occupancy-triggered resource management system, such as described herein.

FIG. 3A depicts a system diagram of a resource management system of a co-working space, such as described herein. The resource management system 300 in this embodiment is in communication with a number of customer devices 302, such as the customer device 304 and the customer device 306. In typical examples, the customer device 304 and the customer device 306 are associated with different customers. For simplicity of description, the embodiments that follow reference the customer device 304, but it may be appreciated that any of the number of customer devices 302 (including the customer device 306) may be similarly configured. In addition, it may be appreciated that the customer device 304 can be configured similarly to the customer device 202 depicted in FIG. 2A.

As with the embodiment depicted in FIGS. 2A-2D, in typical examples, the resource management system 300 and the customer device 304 are in wireless two-way communication (e.g., Bluetooth, Wi-Fi, and so on), but this may not be required. For example, in some embodiments, the customer device 304 generates a beacon or identification signal (e.g., radio-frequency identification signals, near-field communications, Bluetooth Low Energy, and so on) that is received and processed by the resource management system 300.

The customer device 304 typically includes a processor, memory, power supply and/or battery, network connections, sensors, input/output ports, acoustic elements, haptic elements, digital and/or analog circuits for performing and/or coordinating tasks of the customer device 304, and so on. For simplicity of illustration, the customer device 304 is depicted in FIG. 3A without many of these elements, each of which may be included, partially and/or entirely, within the housing and may be operationally or functionally associated with, or coupled to, the display.

Furthermore, as noted with respect to other embodiments described herein, although illustrated as a cellular phone, the customer device 304 can be another customer device 304 that is either stationary or portable, taking a larger or smaller form factor than illustrated. For example, in certain embodiments (and as noted above), the customer device 304 can be a laptop computer, a tablet computer, a wearable device, a health monitoring device, a home or building automation device, a home or building appliance, a craft or vehicle entertainment, control, and/or information system, a navigation device, and so on.

The resource management system 300 also includes an occupancy engine 308. The occupancy engine can be coupled to and/or in communication with an automation engine 310 that is coupled to a device controller 312 and a service controller 314. As with other embodiments, the automation engine 310 can be coupled to—or otherwise in communication with—one or more databases 316.

The occupancy engine 308 of the resource management system 300, in the illustrated embodiment, is in communication with one or more of the customer devices 302. The occupancy engine 308 is configured to detect the presence or absence of the customer devices 302 and, in addition, movement of the customer devices 302 within the co-working space.

The occupancy engine 308 can be associated with one or more sensors or sensors systems that cooperate or independently detect the presence of one or more of the customer devices 302. For example, the occupancy engine 308 can include (or can be coupled to): a global positioning system sensor 318; a wireless network and/or wireless beacon system 320; a proximity detection system 322; a motion detection system 324; a tomographic motion detection system 326; and so on. In addition, the occupancy engine 308 can include a processor 308a, a network interface 308b, and a memory 308c (see, e.g., FIG. 3B)

Figure 3B:
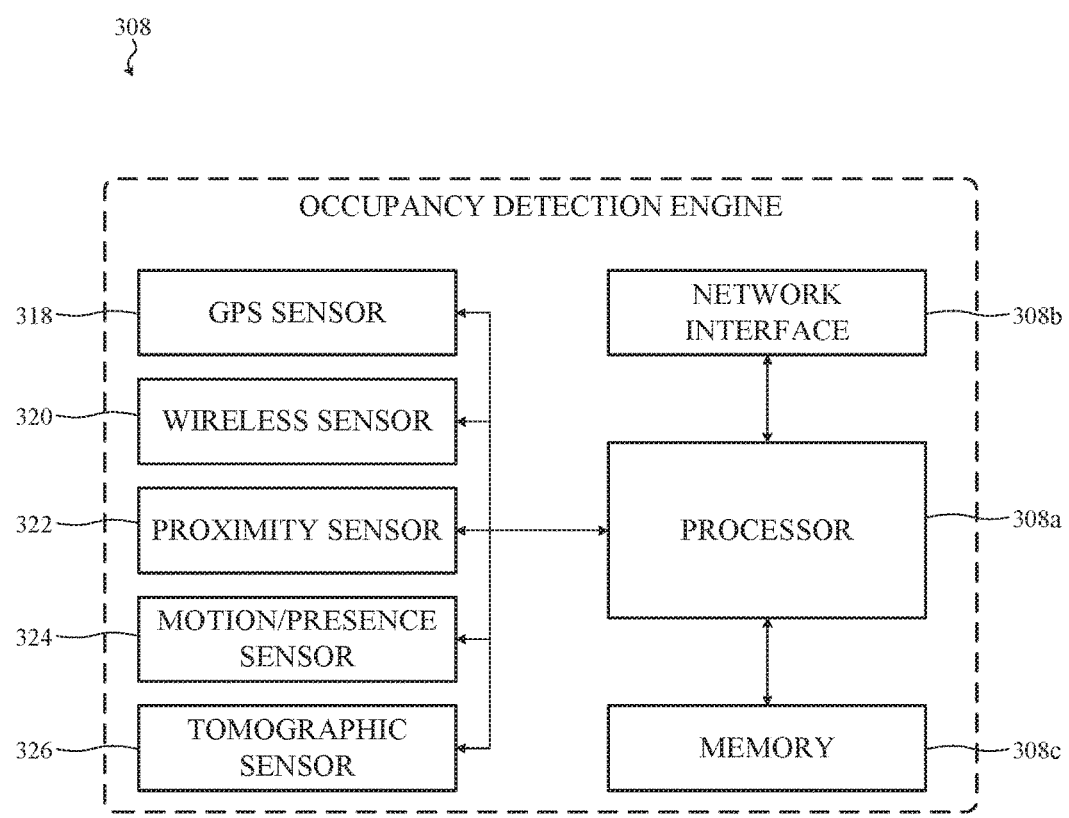
FIG. 3B depicts a system diagram of an occupancy detection engine associated with the resource management system depicted in FIG. 3A.

For example, as shown in FIG. 3B, in many embodiments, the global positioning system sensor 318 receives information from one or more of the customer devices 302. For example, the customer device 304 can include a global positioning sensor that, in turn, communicates a latitude, a longitude, and/or an elevation or altitude to the global positioning system sensor 318. In this manner, the global positioning system sensor 318 can determine a location of one or more of the customer devices 302.

In some embodiments, the wireless network and/or wireless beacon system 320 can be configured to monitor for the presence (e.g., connection) of one or more of the customer devices 302. In one example, the wireless network and/or wireless beacon system 320 can be configured to monitor an address resolution protocol table of a Wi-Fi access point or a routing table of an ethernet switch. After the wireless network and/or wireless beacon system 320 determines that one or more devices have connected to the network, the wireless network and/or wireless beacon system 320 can continually track that device as it moves throughout the co-working space. For example, in some embodiments, the wireless network and/or wireless beacon system 320 may be configured to triangulate a position of a particular device, such as the customer device 304, based on a radio signal strength indicator of two or more access points proximate to the customer device 304.

In still other examples, the wireless network and/or wireless beacon system 320 can be configured to detect the presence of a beacon, such as a Bluetooth Low Energy beacon. The beacon may be tracked throughout the co-working space by the wireless network and/or wireless beacon system 320.

In yet other examples, the wireless network and/or wireless beacon system 320 may be configured to track a radio frequency identification tag or a near field communication tag.

Accordingly, generally and broadly, as with the global positioning system sensor 318, the wireless network and/or wireless beacon system 320 can determine a location of one or more of the customer devices 302.

In some embodiments, the proximity detection system 322 be configured to detect the proximity of one or more objects (e.g., a customer, a customer device, and so on) to a particular location within the co-working space. For example, the proximity detection system 322 may be configured to detect when a customer approaches a door, window, office, or desk. In some cases, the proximity detection system 322 can include one or more infrared or ultrasonic range-finding sensors. In other cases, the proximity detection system 322 can be coupled to a depth-finding imaging system. Accordingly, generally and broadly, as with other sensors and system described herein, the proximity detection system 322 can determine a location within the co-working space of one or more customers and/or customer devices.

In some embodiments, as with the proximity detection system 322, the motion detection system 324 be configured to detect the motion (and/or direction of motion) of one or more objects (e.g., a customer, a customer device, and so on) relative to a particular location within the co-working space. For example, the motion detection system 324 may be configured to detect when a customer approaches a door, window, office, or desk. In some cases, the motion detection system 324 can include one or more infrared or ultrasonic range-finding sensors. In other cases, the motion detection system 324 can be coupled to a depth-finding imaging system or a video capture system. Accordingly, generally and broadly, as with other sensors and system described herein, the motion detection system 324 can determine a location within the co-working space of one or more customers and/or customer devices.

In some embodiments, as with the proximity detection system 322 and the proximity detection system 322, the tomographic motion detection system 326 be configured to detect the motion (and/or direction of motion) of one or more objects (e.g., a customer, a customer device, and so on) within the co-working space. For example, the tomographic motion detection system 326 may be configured to detect when a customer approaches a door, window, office, or desk. The tomographic motion detection system 326 can include a number of nodes distributed throughout the co-working space. Interference patterns caused by motion of a customer between nodes can be interpreted by the tomographic motion detection system 326 as motion in a particular direction. Accordingly, generally and broadly, as with other sensors and system described herein, the tomographic motion detection system 326 can determine a location within the co-working space of one or more customers and/or customer devices.

In the illustrated embodiment, the automation engine 310 is in communication with the occupancy engine 308. For example, the automation engine 310 can be configured to receive site events from the occupancy engine 308. In other cases, the automation engine 310 can be configured to receive other events from the occupancy engine 308 such as, but not limited to: software events; hardware events; movement events; location events; customer instruction events; internal instruction events; aggregated events; and so on.

As with other embodiments described herein, the automation engine 310 can be implemented in any number of suitable ways. In many cases, the automation engine 310 is implemented on a server including at least a processor and a memory. Other configurations may be suitable.

In the illustrated embodiment, site events (or other events) generated or transmitted by the occupancy engine 308 and/or the customer device 304 are received by the automation engine 310 in an event queue 328. The event queue 328 can be implemented in any number of suitable ways, but in many embodiments, the event queue 328 is a message queue (e.g., asynchronous queue).

In many embodiments, the event queue 328 can receive events from other devices or software services as well. For example, the event queue 328 can be communicably coupled to any number of hardware devices, sensors, servers, or systems. In one example, the event queue 328 is connected to a building automation or building security system that submits aggregated events corresponding to building security or automation states (e.g., secure or non-secure, occupied or not occupied, and so on). It may be appreciated that the event queue 328 can receive and enqueue events from any number of sources.

Events received by the event queue 328 are typically serialized (although this may not be required) and passed to a recommendation engine 330. The recommendation engine 330 can be configured as described with respect to other embodiments presented herein (see, e.g., the recommendation engine 102 in FIG. 1). As with other embodiments described herein, the recommendation engine 330 is in communication with the database 210. More specifically, the recommendation engine 330 is configured to submit queries to the one or more databases 316.

Once the recommendation engine 330 has processed events received from the event queue 328 and the one or more databases 316, a recommendation is determined by enlisting a suitable processing algorithm, such as those referenced above. As described with respect to other embodiments described herein, a recommendation can include one or more service actions and/or one or more device actions. Service actions and device actions may be related or independent.

Recommended service actions and device actions generated by the recommendation engine 330 are forwarded to an action controller 332 (see, e.g., FIGS. 2C-2D). The action controller 332 is configured to determine a series of steps, actions, or operations to perform or initiate in order to provide the service actions and device actions recommended by the recommendation engine 330. The action controller 332 is communicably coupled to the device controller 312 and the service controller 314.

In some embodiments, the action controller 332 can be communicably coupled to a review queue 334. The review queue 334 may be configured to govern which actions and/or sequences of actions output from the action controller 332 should be performed. For example, on one embodiment, the review queue 334 may request permission to proceed from the customer device 304. In other cases, the review queue may request permission to proceed from one or more employees of the co-working space.

The foregoing examples describe above, and the various alternatives thereof and variations thereto are presented, generally, for purposes of explanation, and to facilitate an understanding of various configurations and uses of a system, such as described herein. However, it will be apparent to one skilled in the art that some of the specific details presented herein may not be required in order to practice a particular described embodiment, or an equivalent thereof. Similarly, it will be apparent to one skilled in the art that the systems described herein can be modified, adjusted, or otherwise adapted to different service industry businesses than those described above.

Figure 4A:
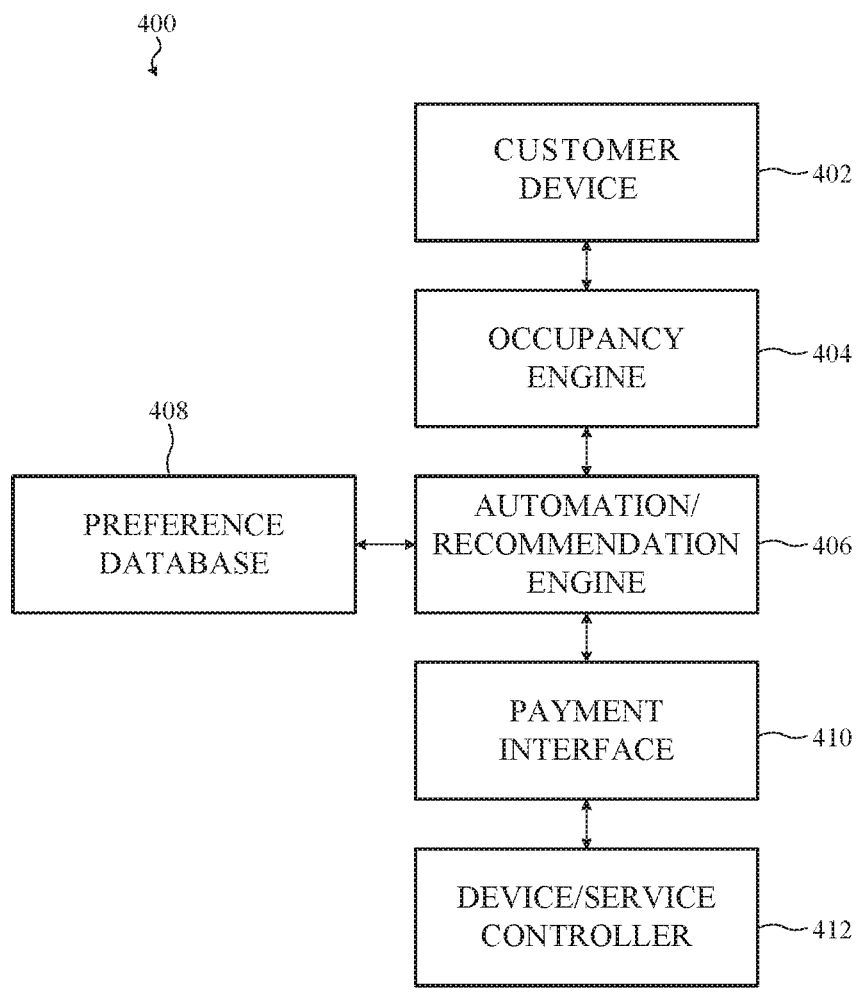
FIG. 4A depicts a system diagram of another resource management system, such as described herein.

For example, in other embodiments, a resource management system can be configured in another manner. FIG. 4A depicts a system diagram of another resource management system, such as described herein. In particular, FIG. 4A depicts a resource management system 400 that processes location information received from a customer device 402 with an occupancy engine 404 to determine a location of a specific customer. Thereafter, an automation and/or recommendation engine 406 accesses one or more preference databases 408 to determine an action or series of actions to perform. In this example, the automation and/or recommendation engine 406 may determine that a billable action has occurred and the customer's account should be charged. For example, the customer may have removed an item from a vending machine. In another example, the customer may have retrieved a coffee prepared for the customer in a café. In another example, the customer may have entered an office subject to a reservation or occupancy charge. It may be appreciated that any suitable billable event can occur.

In this example, the automation and/or recommendation engine 406 can be coupled to a payment interface 410 which in turn can be coupled to a device or service controller 412. The payment interface 410 may be configured to govern which actions and/or sequences of actions output from the automation and/or recommendation engine 406 are properly purchased. In many cases, the payment interface 410 may prevent the device or service controller 412 from performing further actions if it is determined that a customer cannot complete a particular payment associated with a billable event. In other cases, the payment interface 410 may permit the device or service controller 412 to perform further actions. In this example, the payment interface 410 can add to a customer's bill.

Figure 4B:
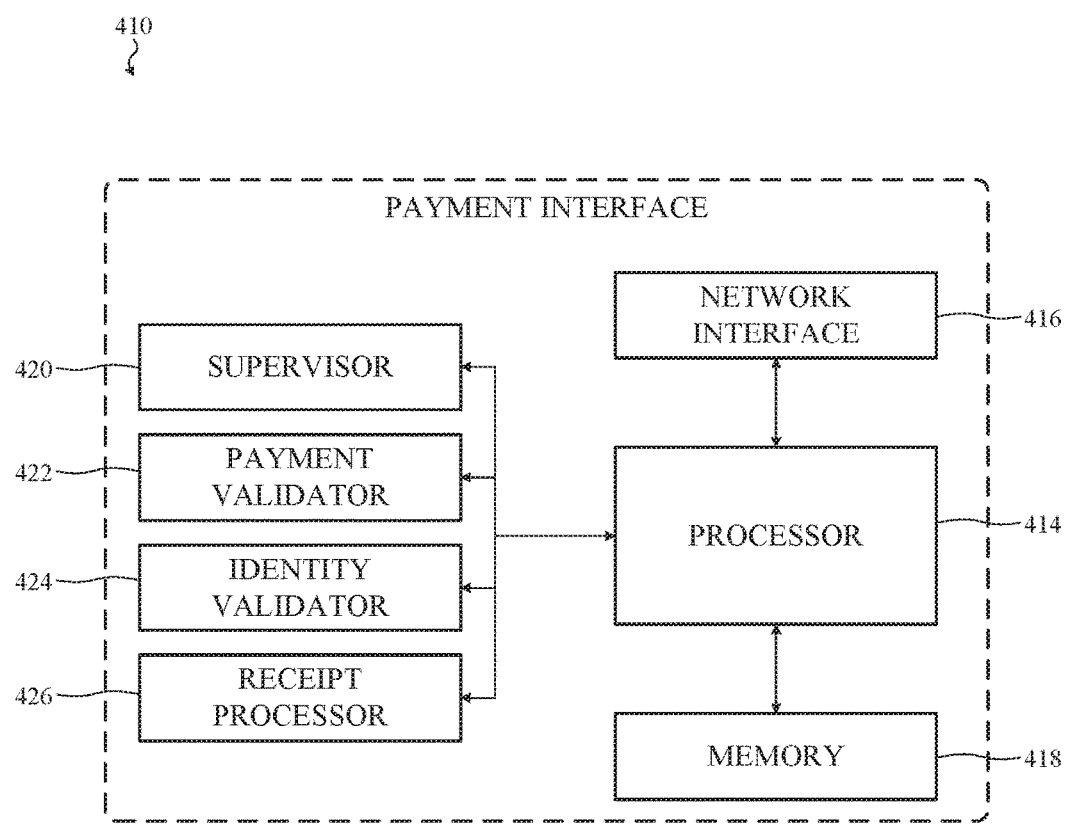
FIG. 4B depicts a system diagram of a payment interface associated with the resource management system depicted in FIG. 4A.

FIG. 4B depicts a system diagram of the payment interface 410. The payment interface includes a processor 414, a network interface 416, and a memory 418. The processor 414 is in turn coupled to (or otherwise in communication with) a payment processing supervisor 420, a payment validator 422, an identity validator 424, and/or a receive processor 428. In this example, the payment processing supervisor 420 can authorize or prohibit one or more further actions of the device or service controller 412 in response to a signal from the payment validator 422 that a payment method is not valid or in response to a signal from the identity validator 424 that a customer cannot be successfully identified.

The foregoing examples describe above, and the various alternatives thereof and variations thereto are presented, generally, for purposes of explanation, and to facilitate an understanding of various configurations and uses of a system, such as described herein. However, it will be apparent to one skilled in the art that some of the specific details presented herein may not be required in order to practice a particular described embodiment, or an equivalent thereof. Similarly, it will be apparent to one skilled in the art that the systems described herein can be modified, adjusted, or otherwise adapted to different service industry businesses than those described above.

For example, in other embodiments, a resource management system can be configured in another manner. In one embodiment, a resource management system can be configured to automatically lock and/or unlock doors, cabinets, windows, lockers, or any other suitable enclosure or volume. More particularly, certain embodiments described herein reference a resource management system configured to control an access control device, such as a door lock.

Generally and broadly, FIGS. 5A-5D depict an access control device that can be operated and/or controlled by a resource management system such as described herein. For simplicity of description, the embodiments that follow reference an access control device coupled to a door, but it may be appreciated that this is merely one example. More particularly, it may be appreciated that an access control device such as described and depicted can be suitably configured to deny or allow access to, without limitation: doors, windows, cabinets, drawers, lockers, vehicles, access panels, and so on.

In some examples, the access control device is configured to extend and withdraw a deadbolt in order to lock or unlock a door or window. The deadbolt may extend from a door into a door frame, or from a door frame into a door.

In other embodiments, a deadbolt or other locking mechanism may not be required. For example, in some embodiments, an access control device can be communicably coupled to or otherwise associated with an opening or closing mechanism (e.g., linear actuator, door regulator, window regulator, swing-door operator, and so on) that is configured to exert a force on a door or window to retain a position of that door or window.

For example, in one embodiment, an access control device—such as described here—is coupled to a swing-door operator that exerts a resistive force on a door such that the door may not be (easily) opened or closed. For example, the swing-door operator may include a hinge lock or a linear actuator that resists changes to the door's angular position. In this example, the access control device does not require a deadbolt or other locking mechanism.

In still further examples, an access control device such as described herein can be used to collect usage data from a customer for a resource management system. For example, the access control device can be in communication with a server of the resource management system that is communicably coupled to—or otherwise associated with—a database such as a relational database. The access control system can update the database based on which customers attempt to use, use, or are prevented from using the access control system. For example, a first customer may prefer to use a specific rentable office space within a co-working space. An access control device can be positioned on or near a door of that rentable office space. Each time the customer attempts to access the rentable office space, the access control system can update a database. After a threshold level of access by the customer, the resource management system may be able to predict the behavior of the first customer when the customer enters the co-working space. In some examples, after a period of time or a minimum number of rentals by the customer, the resource management system can be configured to automatically reserve the office for the benefit of the customer. Similarly, if a second customer continually finds that the office space is rented by the first customer, the resource management system may be configured to automatically find an alternate office space for the benefit of the second customer.

As such, it may be appreciated that the specific examples of access control systems provided herein are a subset of examples of access control systems. In other embodiments, an access control system can be configured differently.

Figure 5A:
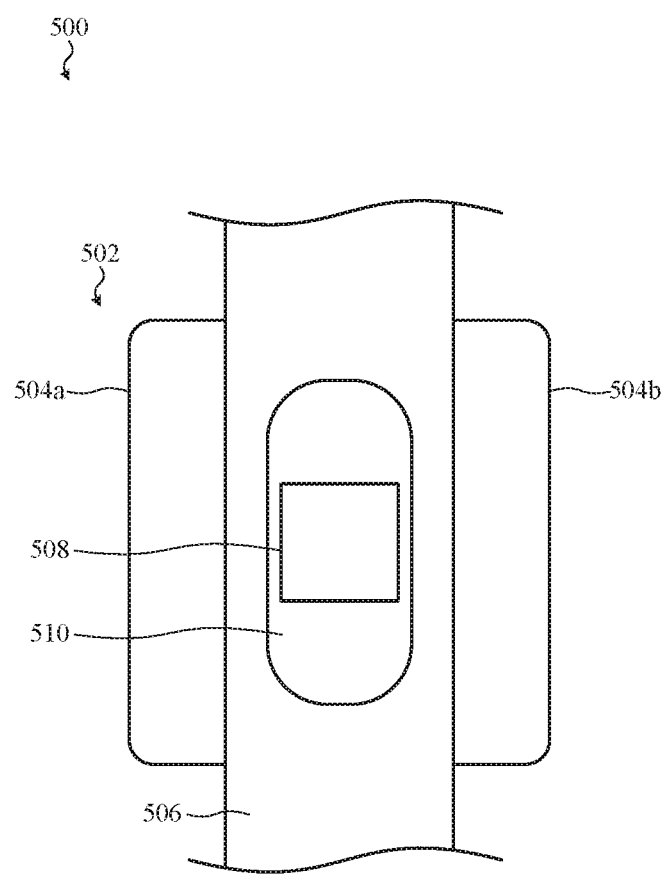
FIG. 5A depicts an example access control device that may be associated with a resource management system such as described herein.
Figure 5B:
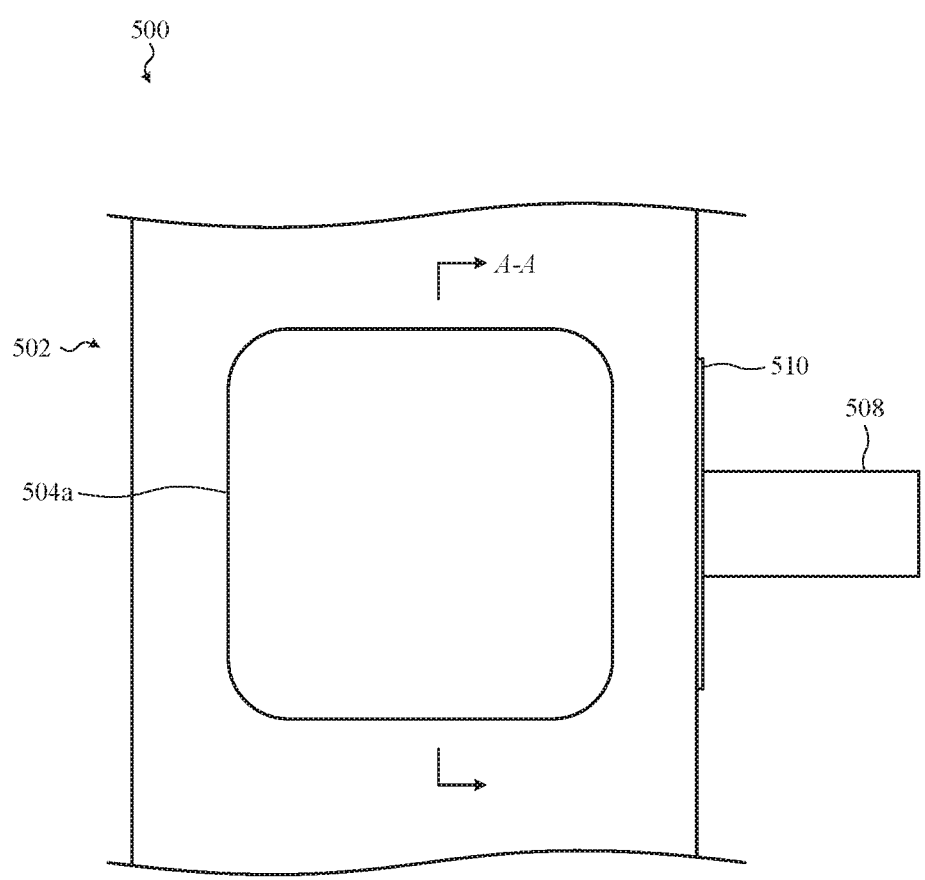
FIG. 5B depicts a front view of the access control device of FIG. 5A.

For example, FIGS. 5A-5B depicts an example access control device that may be associated with a resource management system such as described herein. The access control system 500 includes a lock interface 502 that includes a housing 504. The housing 504 includes an exterior portion 504a and an interior portion 504b, disposed on opposite sides of a door 506. The access control system 500 is configured to extend or withdraw a deadbolt 508 against a faceplate 510. The deadbolt 508 is typically coupled to an actuator (now shown), such as a solenoid or linear actuator. In response to a signal from a resource management system, the actuator can withdraw or extend the deadbolt 508, thereby locking the door 506.

Figure 5C:
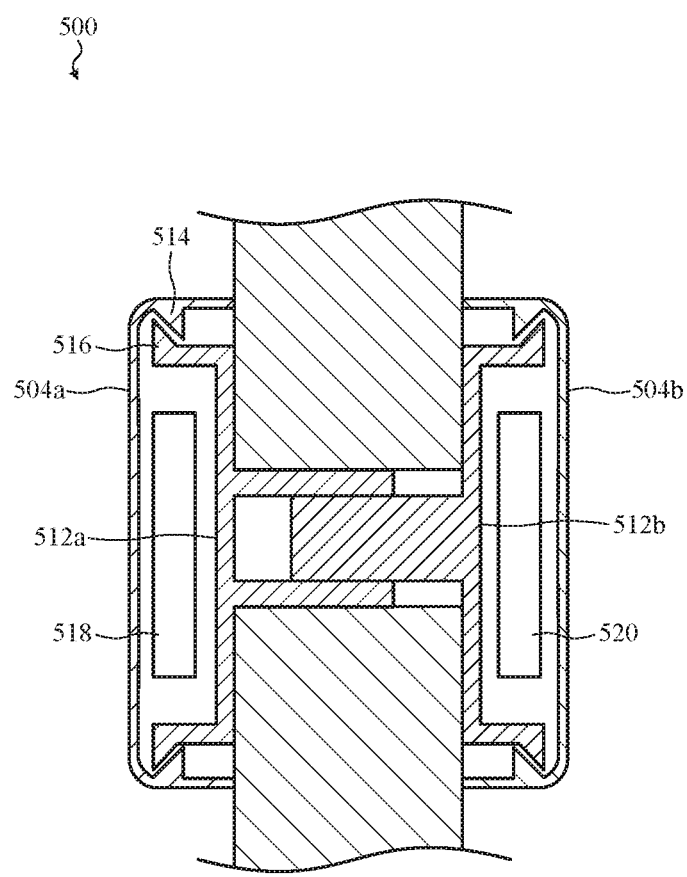
FIG. 5C depicts a cross-section of the access control device of FIG. 5B, taken through line A-A.

FIG. 5C depicts a cross-section of the access control device 500 can be coupled to the door in any number of suitable ways. For example, in one embodiment, the interior portion 504b and the exterior portion 504a are coupled to a central bracket 512 interference fit into the door 506. The exterior portion 504a (and, correspondingly, the interior portion 504b) defines an undercut 514 configured to interlock with a flange 516. In this manner, the housing 504 is retained against the door 506.

The access control device 500 also includes one or more controller/receivers. For example, a first controller/receiver 518 can be disposed within a volume defined by the exterior portion 504a and a second controller/receiver 520 can be disposed within a volume defined by the interior portion 504a. In some cases, only one controller/receiver may be required. For simplicity of description, the embodiments that follow reference the first controller/receiver 518, but it may be appreciated that the second controller/receiver 520 may be similarly configured.

The first controller/receiver 518 typically includes a processor, a memory, a network communication interface, and a power source. In some examples, the power source is a battery whereas in others, the power source is wired connection to a power supply such as, but not limited to: a direct current power source, an alternating power source, a power-over-ethernet source and so on.

The first controller/receiver 518 can also include a receiver coupled to the processor. The receiver can be configured to implement one or more wireless communication or identification protocols. For example, in one embodiment, the receiver of the first controller/receiver 518 is a radio frequency identification receiver. In another embodiment, the receiver of the first controller/receiver 518 is a near field communication receiver. In yet another embodiment, the receiver of the first controller/receiver 518 is a Bluetooth low energy receiver. In yet other embodiment, the receiver can be configured to implement a different wireless protocol.

The receiver and the processor of the first controller/receiver 518 can be configured to respond to instructions provided by a resource management system such as described herein. For example, a resource management system can send an instruction to the processor via the network interface to unlock or lock the door 506 in response to a particular signal received by the receiver. In many cases, the particular signal corresponds to a particular custom or set of customers.

For example, in one embodiment, a customer within a business operating a resource management system such as described herein may be granted access to a particular office space. The office space may remain locked by the access control device 500 until the receiver of the first controller/receiver 518 detects the presence of the customer or a device of the customer (e.g., access card, key fob, cellular phone, and so on). In response, the access control device 500 can withdraw the deadbolt 508 and the door can be unlocked.

Figure 5D:
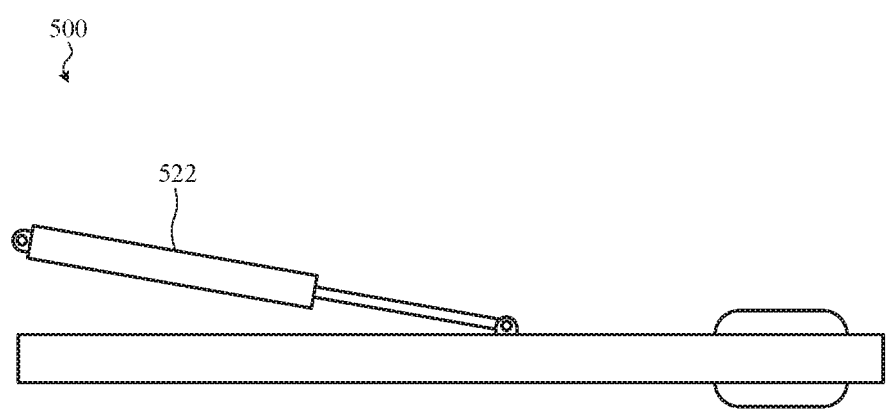
FIG. 5D depicts another example access control device that may be associated with a resource management system, such as described herein.

In some embodiments, the access control system 500 may also open the door 506 in response to a recognized signal received by a receiver. For example FIG. 5D depicts a linear actuator 522 coupled to the door 506. The linear actuator 522 can be communicably coupled to the processor of the first controller/receiver 518 within the external portion 504a of the housing 504. In this manner, once the receiver receives a recognized signal, the linear actuator 522 can open the door 506. In some cases, the door 506 can be opened automatically in response to proximity of the customer (e.g., a "touch-less" access control system).

It will be appreciated that the foregoing embodiment(s) and example(s) described above, and the various alternatives thereof and variations thereto are presented, generally, for purposes of explanation, and to facilitate an understanding of various configurations and uses of a system, such as described herein. As such, it will be apparent to one skilled in the art that some of the specific details presented herein may not be required in order to practice a particular described embodiment, or an equivalent thereof. Similarly, it will be apparent to one skilled in the art that the systems described herein can be modified, adjusted, or otherwise adapted to different service industry businesses than those described above.

Figure 6:
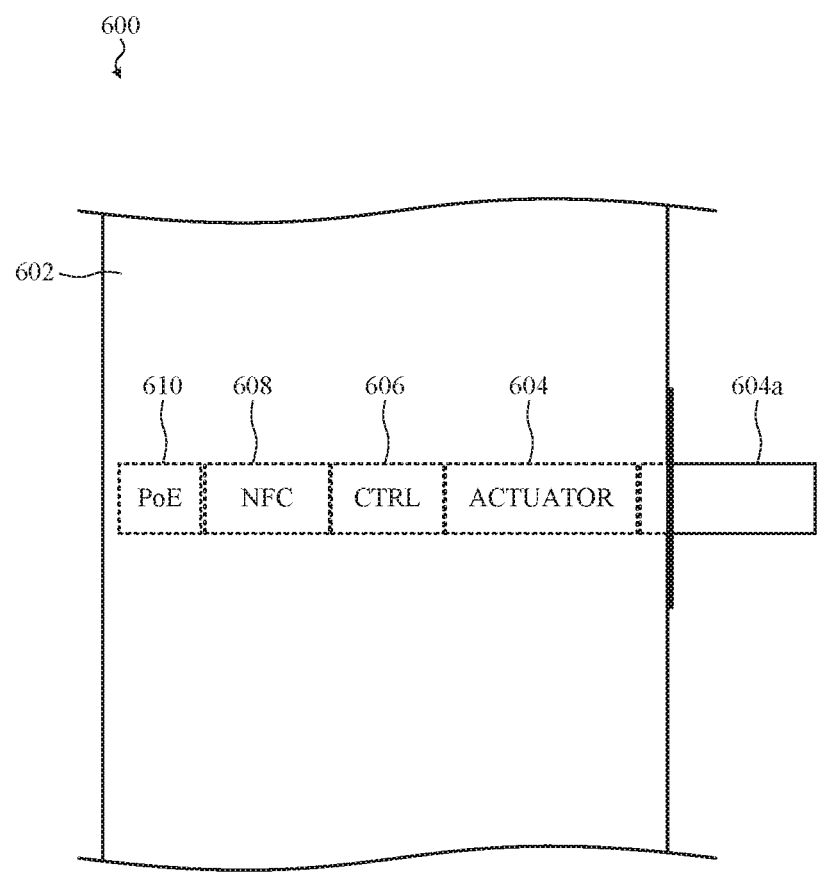
FIG. 6 depicts another example access control device that may be associated with a resource management system, such as described herein.

For example, in other embodiments, an access control system can be implemented in another manner. FIG. 6 depicts another example access control device that may be associated with a resource management system, such as described herein. In this example, a hidden access controller 600 can be disposed entirely within a door 602. The hidden access controller 600 includes an actuator coupled to a deadbolt 604a, a controller 606, a near-field communication receiver 608 and a power-over-ethernet coupling 610. Each of these components can be configured as described herein.

The foregoing examples describe above, and the various alternatives thereof and variations thereto are presented, generally, for purposes of explanation, and to facilitate an understanding of various configurations and uses of a system, such as described herein. However, it will be apparent to one skilled in the art that some of the specific details presented herein may not be required in order to practice a particular described embodiment, or an equivalent thereof. Similarly, it will be apparent to one skilled in the art that the systems described herein can be modified, adjusted, or otherwise adapted to different service industry businesses than those described above.

Generally and broadly, FIGS. 7-11 relate to methods of operating a resource management system such as described herein.

Figure 7:
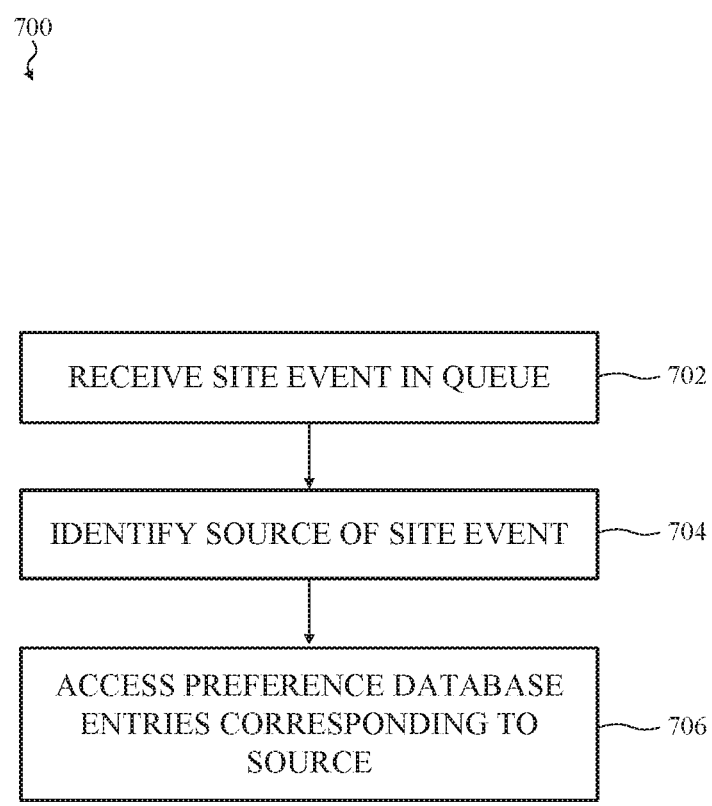
FIG. 7 is a simplified flowchart depicting example operations of a method of operating a resource management system, such as described herein.

FIG. 7 is a simplified flowchart depicting example operations of a method of operating a resource management system, such as described herein. The method 700 beings at operation 702 in which a site event is received in an event queue. Thereafter, at operation 704, a source of the site event (e.g., a particular customer device) can be identified. Thereafter, at operation 706, a preference database can be accessed corresponding to the identified source of the site event.

Figure 8:
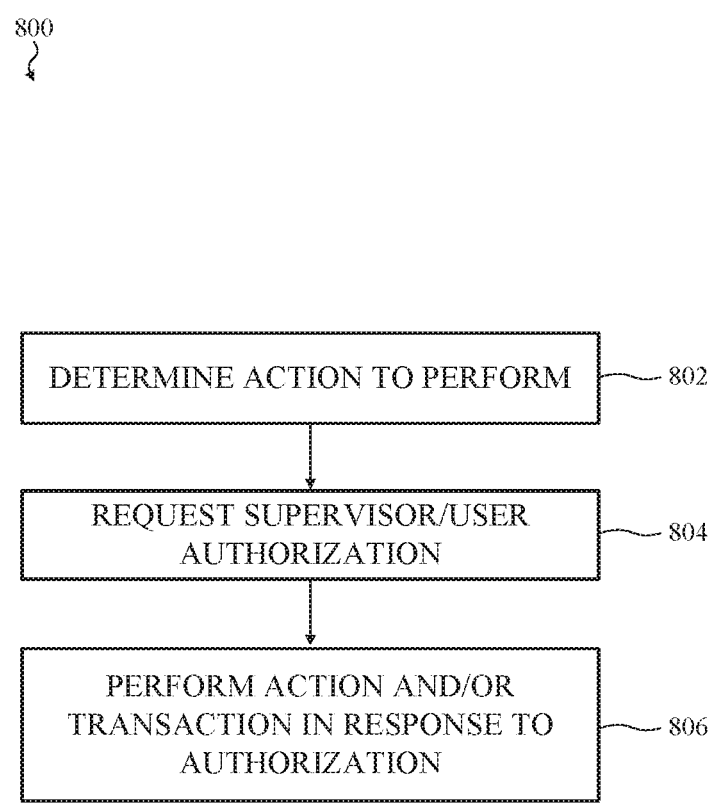
FIG. 8 is a simplified flowchart depicting example operations of another method of operating a resource management system, such as described herein.

FIG. 8 is a simplified flowchart depicting example operations of another method of operating a resource management system, such as described herein. The method 800 begins at operation 802 in which an action to perform is determined. Next, at operation 804, a supervisor's and/or user's (e.g., customer) permission to proceed is obtained. Finally, at operation 806, an action and/or a transaction is performed.

Figure 9:
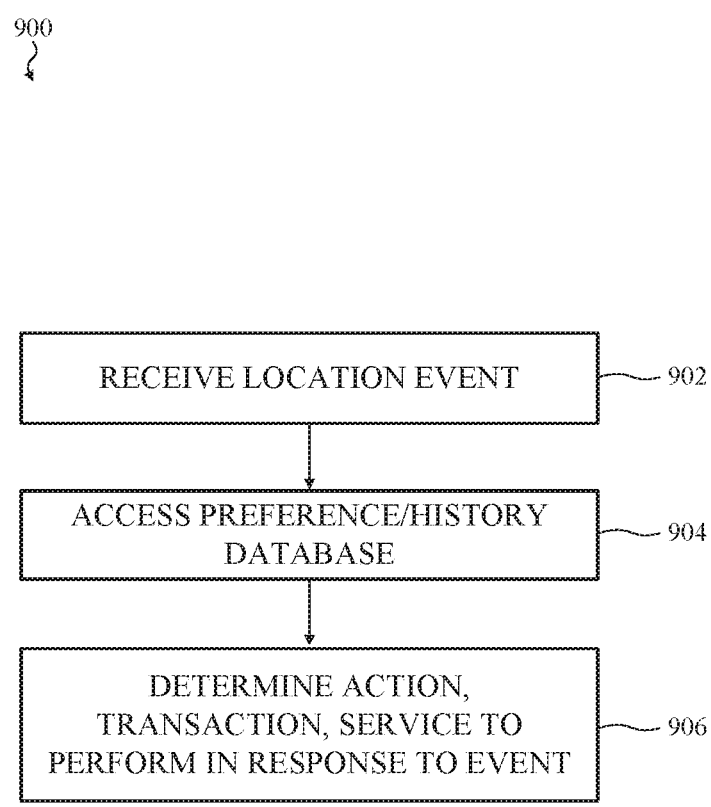
FIG. 9 is a simplified flowchart depicting example operations of another method of operating a resource management system, such as described herein.

FIG. 9 is a simplified flowchart depicting example operations of another method of operating a resource management system, such as described herein. The method 900 beings at operation 902 in which a location event is received. Next, at operation 904, a preference and/or history database is accessed. Finally, at operation 906, an action, transaction, and/or a service to be performed—based on the preference and/or history database query results—is determined.

Figure 10:
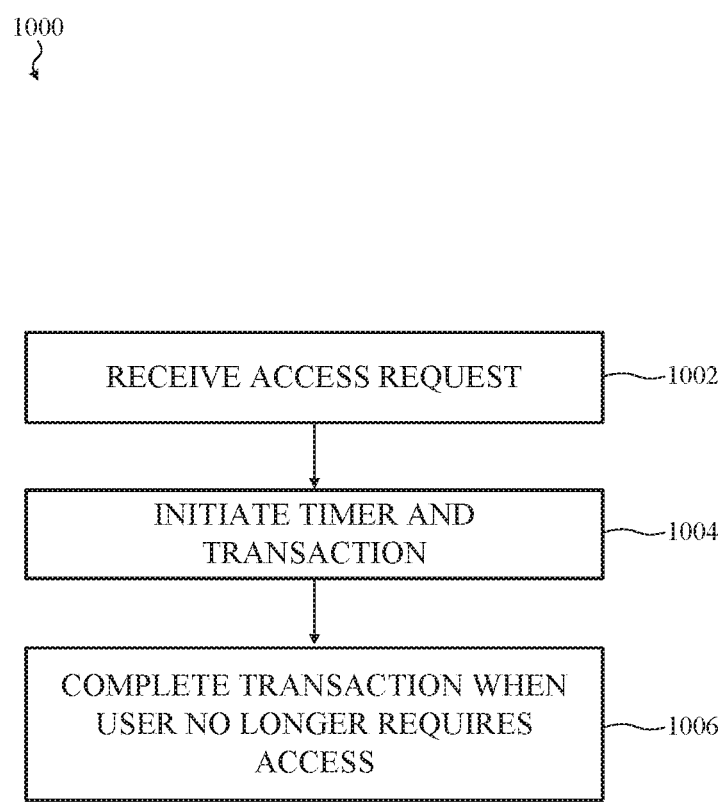
FIG. 10 is a simplified flowchart depicting example operations of another method of operating a resource management system, such as described herein.

FIG. 10 is a simplified flowchart depicting example operations of another method of operating a resource management system, such as described herein. The method 1000 being as operation 1002 in which an access request is received (e.g., access to a room, a service, a piece of equipment, and so on). Next, at operation 1004, a time-based transaction is initiated. Finally, at operation 1006, when the timer expires or the user/customer does not require access, the transaction is completed.

Figure 11:
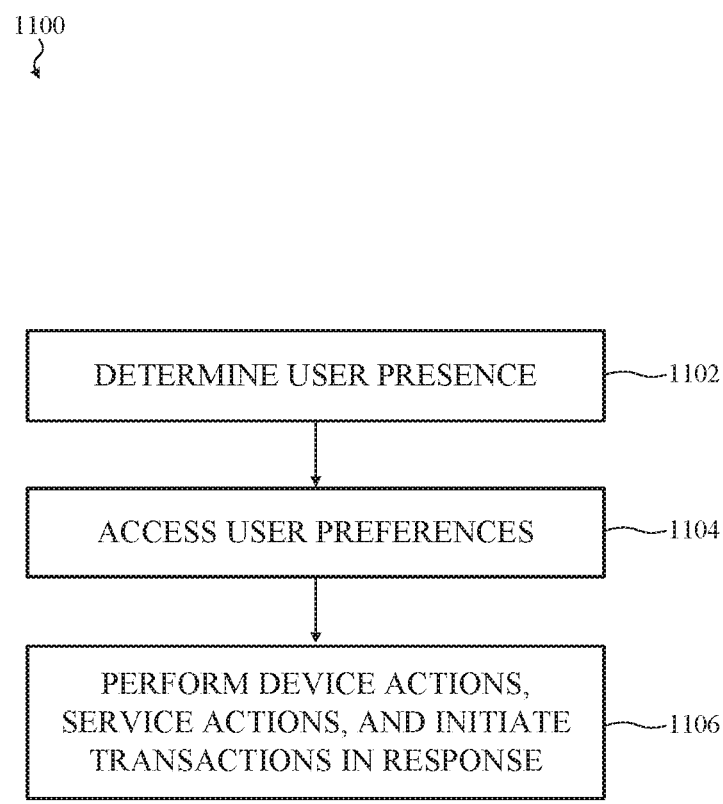
FIG. 11 is a simplified flowchart depicting example operations of another method of operating a resource management system, such as described herein.

FIG. 11 is a simplified flowchart depicting example operations of another method of operating a resource management system, such as described herein. The method 1100 begins at operation 1102 in which a user presence and/or a customer presence is detected. At operation 1104, a user or customer preference database is accessed. Finally, at operation 1106, one or more device or service actions can be performed in response to the customer database query results.

One may appreciate that although many embodiments are disclosed above, that the operations and steps presented with respect to methods and techniques described herein are meant as exemplary and accordingly are not exhaustive. One may further appreciate that alternate step order or fewer or additional operations may be required or desired for particular embodiments.

Although the disclosure above is described in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the some embodiments of the invention, whether or not such embodiments are described and whether or not such features are presented as being a part of a described embodiment. Thus, the breadth and scope of the present invention should not be limited by any of the above-described exemplary embodiments but is instead defined by the claims herein presented.

What is claimed is:

1. A service industry resource management system comprising:
   an access control device installed in a door of a rentable space and comprising;
      a power-over-ethernet coupling;
      a controller powered by the power-over-ethernet coupling; and
      a wireless receiver in communication with the controller and powered by the power-over-ethernet coupling;
   an actuator coupled to the door and in communication with the access control device; and
   an automation engine comprising:
      a processor in communication with the controller through the power-over-ethernet coupling; and
      a non-transitory memory configured to store executable instructions that, when executed by the processor, cause the processor to:
         track a location of a customer device relative to the rentable space, the customer device associated with a customer;
         automatically place a reservation to reserve the rentable space for the customer upon determining that the customer device is approaching the rentable space;
         instruct the actuator to automatically open the door to the rentable space after the wireless receiver of the access control device determines that the customer device is approaching the wireless receiver;
         automatically initiate billing of the customer for the rentable space after the door is opened by the actuator; and
         automatically terminate billing of the customer of the rentable space upon determining that the customer device has vacated the rentable space.

2. The service industry resource management system of claim 1, wherein the wireless receiver of the access control device comprises at least one of a near-field communication receiver or a Bluetooth receiver.

3. The service industry resource management system of claim 1, wherein the automation engine is in communication with a lighting controller configured to adjust lighting within the rentable space.

4. The service industry resource management system of claim 3, wherein the executable instructions, when executed by the processor, cause the processor to:
   automatically communicate an instruction to the lighting controller to set the lighting within the rentable space according to a preference of the customer stored in the memory upon reserving the rentable space for the customer.

5. The service industry resource management system of claim 1, wherein the automation engine is in communication with a point-of-sale system.

6. The service industry resource management system of claim 4, wherein the executable instructions, when executed by the processor, cause the processor to:
   automatically communicate an instruction to the point-of-sale system to initiate a transaction according to a preference of the customer stored in the memory upon reserving the rentable space for the customer.

7. A method of automatically billing a customer for temporary use of a rentable space within a building of a service industry business, the method comprising:
   tracking a location of a customer device within or adjacent to the building, the customer device associated with a customer;
   accessing a preference database and determining a preference of the customer corresponding to the rentable space;
   after determining the customer preference and after determining that the customer device has entered the building and is approaching the rentable space, automatically reserving the rentable space for the customer to prevent use of the rentable space by another customer;
   requesting authorization from the customer device to initiate billing of the customer for the rentable space;
   determining, by a wireless receiver within an access control device installed in a door of the rentable space, a proximity of the customer device to the rentable space;
   automatically opening the door to the rentable space with an actuator upon determining that the proximity has crossed a threshold;
   initiating billing of the customer for use of the rentable space upon opening the door; and
   automatically terminating billing of the customer upon determining that the customer device has vacated the rentable space.

8. The method of claim 7, further comprising, after receiving authorization from the customer device, instructing the access control device to unlock the door to the rentable space.

9. The method of claim 8, wherein the access control device comprises a controller coupled to the wireless receiver and configured to determine the proximity of the customer device relative to the rentable space.

10. The method of claim 9, wherein the wireless receiver comprises at least one of a near-field communication receiver or a Bluetooth receiver.

11. The method of claim 7, wherein the rentable space is a rentable office space of a co-working business.

12. The method of claim 7, further comprising, after initiating billing of the customer for the rentable space upon determining that the proximity is below the threshold, terminating billing of the customer for the rentable space upon determining that the proximity is beyond the threshold.

13. A method of automatically billing a customer for temporary use of a rentable space within a building of a service industry business, the method comprising:
   determining entrance of a customer device into the building, the customer device associated with a customer;
   automatically reserving the rentable space for the customer and
   upon determining that the customer device is approaching the rentable space:
      accessing a preference database to retrieve an environmental preference of the customer when the customer is within the rentable space;
      causing an environmental controller to adjust a temperature within the rentable space based on the environmental preference;
      causing a lighting controller to adjusting lighting within the rentable space based on the environmental preference;
      determining, by an access control device installed within a door, that the customer device is approaching the door;
      causing an actuator to automatically open the door to the rentable space in response to determining that the customer device is approaching the door;

initiating billing of the customer for the rentable space upon determining that the customer device is within the rentable space; and terminating billing of the customer for the rentable space upon determining that the customer device has vacated the rentable space.

14. The method of claim 13, further comprising, after determining entrance of the customer device within the building, accessing the preference database to obtain a food service preference of the customer when the customer is within the building.

15. The method of claim 14, further comprising causing a service action controller to initiate a food service transaction based on the food service preference.

16. The service industry resource management system of claim 1, wherein the door is a latchless door.

17. The method of claim 7, wherein the door is a latchless door.

* * * * *